United States Patent [19]

Inoue et al.

[11] Patent Number: 5,400,186
[45] Date of Patent: Mar. 21, 1995

[54] APPARATUS AND METHOD FOR RECORDING AND REPRODUCING DIGITAL SIGNALS BY ERROR-CORRECTING-ENCODING OF VIDEO AND AUDIO SIGNALS COLLECTIVELY

[75] Inventors: Tohru Inoue; Ken Onishi; Masaru Kawabata, all of Nagaokakyo, Japan

[73] Assignee: Mitsubishi Denki Kabushiki Kaisha, Tokyo, Japan

[21] Appl. No.: 10,368

[22] Filed: Jan. 28, 1993

[30] Foreign Application Priority Data

Jan. 29, 1992 [JP] Japan .................. 4-013718
Jan. 29, 1992 [JP] Japan .................. 4-013959
Jan. 30, 1992 [JP] Japan .................. 4-015053
Feb. 4, 1992 [JP] Japan .................. 4-018740

[51] Int. Cl.6 .............. G11B 5/00; G11B 5/09; H04N 5/95; H04N 5/91; H04N 5/76
[52] U.S. Cl. ................. 360/32; 358/336; 358/341; 358/343
[58] Field of Search ........ 360/32, 38.1, 51, 8, 360/64, 13, 48; 358/314, 335, 336, 341, 343

[56] References Cited

U.S. PATENT DOCUMENTS

| | | | |
|---|---|---|---|
| 4,143,406 | 3/1979 | Tsuki et al. | 360/48 |
| 4,222,019 | 9/1980 | Onishi et al. | 360/32 |
| 4,234,896 | 11/1980 | Onishi et al. | 360/32 |
| 4,356,517 | 10/1982 | Ozaki et al. | 360/32 X |
| 4,364,096 | 12/1982 | Ozaki et al. | 360/32 X |
| 4,423,441 | 12/1983 | Ozaki et al. | 360/32 X |
| 4,549,229 | 10/1985 | Nakano et al. | 360/64 X |
| 4,562,491 | 12/1985 | Kawabata et al. | 360/51 |
| 4,882,638 | 11/1989 | Onishi et al. | 360/32 |
| 5,012,361 | 4/1991 | Chiba et al. | |
| 5,309,290 | 5/1994 | Sugiyama et al. | 360/32 |

FOREIGN PATENT DOCUMENTS

| | | |
|---|---|---|
| 0267029 | 5/1988 | European Pat. Off. |
| 0437316 | 7/1991 | European Pat. Off. |
| 0464698 | 1/1992 | European Pat. Off. |
| 0498617 | 8/1992 | European Pat. Off. |
| 4126480 | 4/1992 | Japan. |

Primary Examiner—Donald Hajec
Assistant Examiner—Patrick Wamsley

[57] ABSTRACT

A digital VTR is provided for recording data for one-frame of video and audio signals, which have been error-correcting-encoded collectively, in a predetermined number of pieces of tracks during normal recording and for recording data for the video and audio signals, which have been error-correcting-encoded collectively, in one less than the predetermined number of tracks and data for the audio signal, which have been error-correcting-encoded during post-scoring, in the remaining one track exclusively for the post-scoring during post-scoring audio recording.

26 Claims, 21 Drawing Sheets

Fig. 4
Prior Art
D2 FORMAT
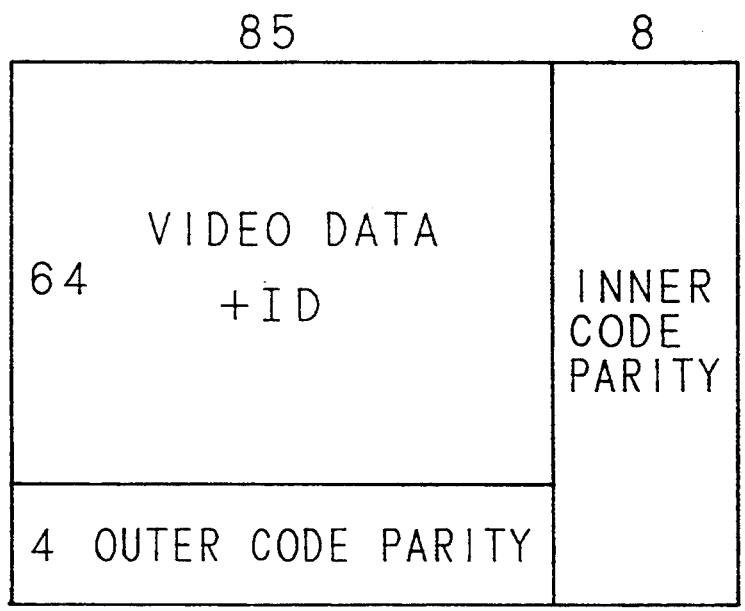
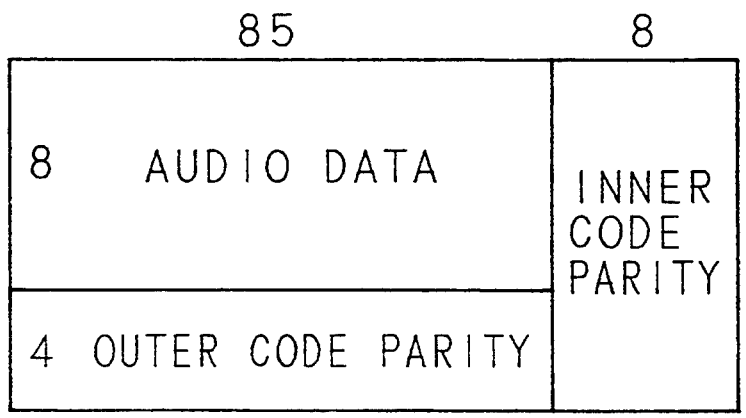

Fig. 9
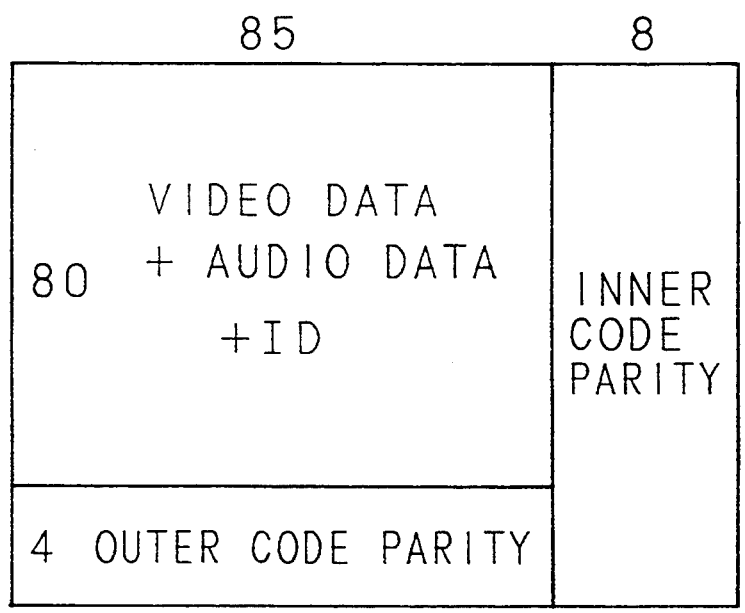
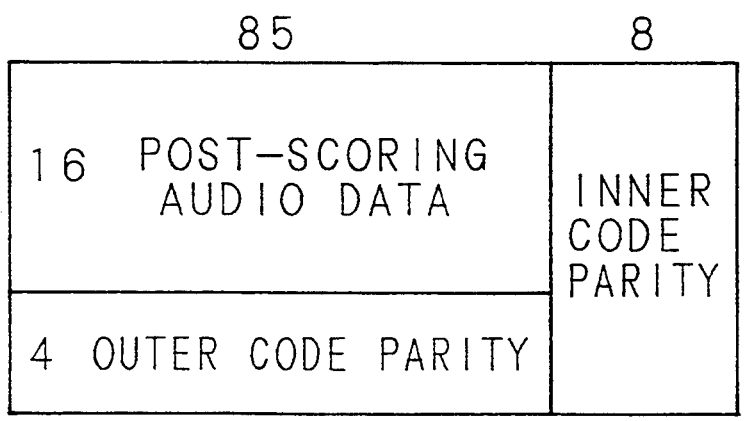

TRACK(a)  TRACK(b)

Fig. 12(a)

ERROR-CORRECTING CODE
DURING NORMAL RECORDING

| k3 | k1 VIDEO DATA | VIDEO INSPEC-TION DATA (INNER CODE) |
|---|---|---|
| | VIDEO INSPECTION DATA (OUTER CODE) | |
| | AUDIO INSPECTION DATA (OUTER CODE) | AUDIO INSPECTION DATA (INNER CODE) |
| | k2 AUDIO DATA | |

Fig. 12(b)

ERROR-CORRECTING CODE
DURING REWRITING OF AUDIO SIGNAL

| VIDEO DATA | VIDEO INSPEC-TION DATA (INNER CODE) |
|---|---|
| VIDEO INSPECTION DATA (OUTER CODE) | |

← GAP 3

| AUDIO INSPECTION DATA (OUTER CODE) | AUDIO INSPECTION DATA (INNER CODE) |
|---|---|
| AUDIO DATA | |

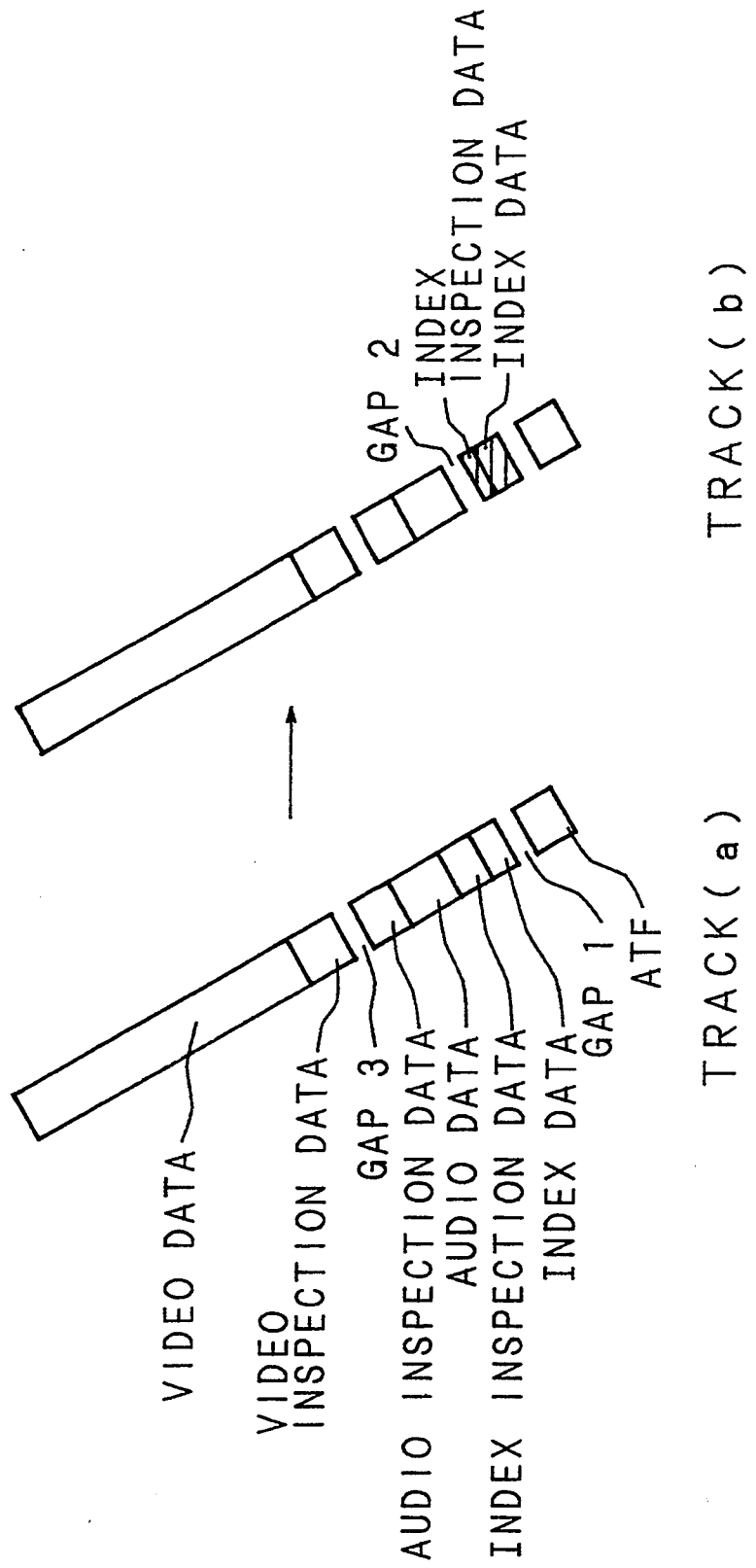

APPARATUS AND METHOD FOR RECORDING AND REPRODUCING DIGITAL SIGNALS BY ERROR-CORRECTING-ENCODING OF VIDEO AND AUDIO SIGNALS COLLECTIVELY

BACKGROUND OF THE INVENTION

1. Field of the Invention

This invention relates to a rotary head type digital signal recording and reproducing apparatus and to a digital signal recording and reproducing method for digitally recording the video and audio signals on a magnetic tape.

2. Description of the Related Art

Conventionally, various systems of rotary head type digital signal recording and reproducing apparatus have been developed. As a typical example of such apparatuses, a digital VTR for a broadcasting service known as a D-2 system will be given an explanation hereinafter.

FIG. 1 is a schematic block diagram showing one example of the D-2 system for a digital VTR. In the figure, numeral 101 is an input terminal for a video signal, via which an analog video signal enters an A/D converter 103, which converts the analog video signal to a digital signal and outputs the digital video signal to a digital recording signal processor 105. On the other hand, numeral 102 is an input terminal for an audio signal, via which an analog audio signal enters an A/D converter 104, which converts the analog audio signal to a digital signal and outputs the digital audio signal to the digital recording signal processor 105. The digital recording signal processor 105 carries out error-correction encoding, digital modulation, etc. and outputs the processed signal to recording AMPs 106, 107. The recording AMPs 106, 107 amplify input signals. The amplified signal is distributed to four recording and reproducing heads 112, 113, 114 and 115 via recording/reproducing selecting switches 108 and 109 and via head selection switches 110, 111 and is recorded on a magnetic tape (not shown). Numerals 116–122 show components of a reproducing part, where reproducing AMPs 116 and 117 amplify signals which are reproduced on recording and reproducing heads 112, 113, 114, 115 and are transferred through switches 110, 111 and through switches 108, 109, and then the amplified signals are output to a digital reproducing signal processor 118. The digital reproducing signal processor 118 carries out digital demodulation and error-correction decoding etc., and outputs video and audio signals of normal signal strings to D/A converters 119 and 120. The D/A converter 119 converts the input signal to the original analog video signal and outputs the analog video signal via an output terminal 121. The D/A converter 120 converts the input signal to the original analog audio signal and outputs the analog audio signal via an output terminal 122.

FIG. 2 shows a tape format of the D-2 system for a digital VTR. As shown in FIG. 2, in the D-2 system, a cue, time record, and control tracks are provided in the longitudinal direction of the magnetic tape. On the track tilted in the longitudinal direction of the magnetic tape, video and audio signals are digitally recorded. The audio signal is arranged in a total of four channels; the video signals are sandwiched by four channels with two channels on either side.

Referring now to FIG. 1, operations will be described in detail hereinafter. A composite video signal supplied to the input terminal 101 is sampled at a quadruple subcarrier frequency (14.318 MHz) and is converted into the digital signal of 8 quantized bits (at the A/D converter 103). The audio signal supplied to the input terminal 102 is sampled at 48 kHz and is converted into the digital signal of 20 quantized bits (at the A/D converter 104). In FIG. 1, for simplification, the audio signal input is represented by one channel but, in practice, a four channel audio signal is supplied. The digitized video and four-channel audio signals are supplied to the digital recording signal processor 105. At the digital recording signal processor 105, the video and four-channel audio signals are time-base-processed and at the same time error-correcting codes are assigned to these signals in accordance with the format. The error-correcting codes are separately assigned to the respective video and four-channel audio signals. The digital recording signal processor 105 further performs digital modulation processing in accordance with a specified modulation system. The output signal of digital recording signal processor 105 is distributed to the recording and reproducing heads 112, 113, 114, and 115, respectively, by the head selection switches 110 and 111 via recording AMPs 106, 107 as well as recording/reproducing selecting switches 108, 109, and is recorded on a magnetic tape in accordance with the tape format shown in FIG. 2. In this system, the data rate after the error-correcting code assigning is 127 Mbit/sec, and in terms of the video signal, the data for 1 field is divided to be recorded in 6 tracks.

The recorded signal is reproduced as follows. The signal reproduced by the recording and reproducing heads 112, 113, 114, 115 enters the digital reproducing signal processor 118 after being passed through head selection switches 110 and 111 as well as the recording/reproducing selecting switches 108 and 109 and amplified by the reproducing AMPs 116, 117. The digital reproducing signal processor 118 performs digital demodulation and error-correction decoding and the signal is decoded into the normal video signal data string and the 4-channel audio signal data string to be outputted. The output signal of the digital reproducing signal processor 118 is returned to the original video and 4-channel audio signals by the D/A converters 119, 120 and outputted via the output terminals 121, 122.

FIG. 3 shows a schematic block diagram for another conventional configuration of the D-2 system for a digital VTR. Numeral 201 in the figure is an A/D converter which converts analog video and 4-channel audio signals into digital signals, respectively. A video signal processor 202, a first audio signal processor 203a, a second audio signal processor 203b, a third audio signal processor 203c, and a fourth audio signal processor 203d sample an output digital signal from each A/D converter 201 at a specified frequency and output the sampled output digital signal to a corresponding first digital signal processor 204a and second digital signal processors 204b, 204b, 204b, 204b. Each of the first and second digital signal processors 204a, 204b assigns error-correcting codes to the signal and then outputs the signal to a digital signal processor 206 via a switch 205. The digital signal processor 206 performs digital modulation processing on the input signal and then outputs the signal to a recording AMP 207. The recording AMP 207 amplifies the input signal. The amplified signal is recorded on a magnetic tape (not shown) by a recording and reproducing head 209 via a recording/reproducing selector switch 208. Numeral 210 is a reproduction unit which is so configured that the process is carried out in reverse sequence to that in the recording unit and therefore, the internal configuration of which is omitted.

Because the D-2 system is standardized as a digital VTR for broadcasting, azimuth recording is performed without a guard band between tracks in the D-2 format. As shown in FIG. 2, the audio signal, the video signal, and the audio signal are arranged in this order in the head scanning direction and the audio signal is arranged in two channels each on either edge of the track, and form a total of four channels. In the D-2 composite system, one line of the video signal is made to contain 910 samples by sampling at 4 $f_{sc}$, four times the subcarrier. After the 768 samples excluding the horizontal synchronizing signal are divided into two channels with the vertical synchronizing signal being excluded, the samples in ½ of the field of 85 lines are collected and the order of 384×85×8 bits of data are rearranged by shuffling. An error-correcting code is assigned to the data and the data are recorded as a track pattern. FIG. 4 shows a format in which a video signal area and an audio signal area are error-correcting-encoded. The pixel data of one field are divided into three portions, separated into even numbered samples and odd numbered samples and recorded in separate tracks. One field consists of six tracks and the pattern format of each track is identical.

Now referring to FIG. 3, operations are briefly explained. The audio signal supplied to the input terminal is converted into a 20-bit digital signal by the A/D converter 201. Sampling is performed at 48 kHz. The error-correcting codes are assigned separately to the video signal and the audio signal at the digital signal processors 204a, 204b, respectively. Further, at the digital signal processor 206, digital modulation processing is performed in accordance with a specified modulation format. The output of the digital signal processor 206 is passed through the recording AMP 207 as well as the recording/reproducing selector switch 208, distributed to the recording and reproducing head 209 by the head selection switch (not shown), and recorded on a magnetic tape in accordance with a tape format. In this system, the data rate, after an error-correction code is assigned, is 127 Mbit/sec and in terms of the video signals, the data of one field are divided into 6 tracks to be recorded.

As described above, because in this format, the audio signal is separately recorded in four individual channels, editing can be performed independently for each channel. In order to perform editing independently for each channel, a track format in which the audio signal of one channel is recorded as one area is required. In short, an area dividing type track format is required. Then, a gap between the areas is also required. In addition, because the data rate of the video and audio signals are different, the video signal area is large, while the audio signal is smaller than the video signal area. Consequently, in order to give the audio signal area error correction capability equivalent to that of the video signal area, for example, in the D-2 format audio code (12, 8, 5) Reed-Solomon codes may be so arranged that the codes keep an equal distance with each other as in the video C2 code (68, 64, 5) Reed-Solomon codes wherein, (n, k, d) represent the code length by n, information length by k, and the distance between codes by d. However, the equivalent error-correcting capability may be obtained but the encoding efficiency becomes extremely poor; 8/12 for the audio signal against 64/68 for the video signal.

Because the digital VTR for broadcasting apparatuses is configured as described above, the digital VTR has appropriate qualities for business use such as high reliability, high picture quality, high sound quality, and highly sophisticated editing. Yet, on the other hand, because the digital VTR employs an area dividing type format as described above, gaps must be provided and in addition, when the equal error correcting capabilities are given to both the video and audio signals, the encoding efficiency of the audio signal decreases. In home digital VTR, compactness and user-friendliness are strongly required as is the case with presently available VTRs equipped with a camera in the market.

SUMMARY OF THE INVENTION

One object of the present invention is to provide a digital signal recording and reproducing apparatus (digital VTR) which achieves excellent encoding efficiency and can perform audio signal editing.

Another object of the present invention is to provide a digital signal recording and reproducing apparatus (digital VTR) which achieves compactness suited for domestic use and is easy to operate.

In the digital signal recording and reproducing apparatus according to the first embodiment, video and audio signals are integrated and an error-correcting code is assigned to them collectively when video and audio signals are digitally recorded in the tracks on a magnetic tape.

According to the first embodiment, the digitized video and audio signals, which are separately arranged in one track, are integrated and error-correcting codes are assigned to the integrated data. Thus, error-correction-encoding is effected. This process improves encoding efficiency of the audio signal, gives equal error-correcting capabilities to the video and audio signals, and makes it possible to form a more compact system.

In the digital signal recording and reproducing apparatus according to the second embodiment, at least one track is designated as an exclusive track for post scoring when video and audio signals of one frame are divided to be recorded in a plurality of tracks. Because at least one track is set exclusively for post-scoring in addition to tracks in which video and audio signals are recorded during normal recording, the error-correcting code for the post-scoring signal achieves the equivalent level to those for other tracks, (and obtains the equivalent error-correcting capability,) for improving the encoding efficiency as well as making post-scoring editing possible. Even if the post-scoring audio recording is repeated many times, the audio signal recorded during the normal recording is not erased and thus, the operational capability during the post-scoring audio recording is improved.

In the digital signal recording and reproducing apparatus according to the third embodiment, a part of the video signal extracted in the second embodiment is recorded in the track designated for post-scoring during the normal recording. Consequently, because a part of the video signal can be recorded in an area different from the area where the video signal is normally recorded, the video signal of a better picture quality can be recorded and reproduced.

In the digital signal recording and reproducing method of the fourth embodiment, the video and audio signals, which are divided and arranged in one track, are integrated and an error-correcting code is assigned to this integrated data. Referring to one track, there are only two recording areas, for permitting only one place to provide a gap which improves the recording efficiency. When the number of audio channels is further increased for recording, error-correction codes are assigned to another area to carry out recording. Thus, the encoding efficiency of the audio signal is further improved, the error-correction capabilities for the video and audio signals are brought to an equal level, thereby making it possible to form a more compact system.

In the digital signal recording and reproducing method of the fifth embodiment, the post-scoring audio signal is recorded in an area different from the main video recording area after an error-correcting code is assigned. The error-correcting code of the post-scoring audio signal becomes equal to that of the main recording area and the encoding efficiency can be improved with the error-correcting capabilities being brought to the equivalent level, and at the same time post-scoring editing is made possible. Even if the post-scoring audio recording fails, the audio signal recorded during the normal recording is not erased, for improving the operational capability of the post-scoring audio recording.

The digital signal recording and reproducing method according to the sixth embodiment, concerns the normal recording at the fifth embodiment, wherein a part of the extracted video signal is recorded in an area different from the main video recording area. Since a part of video signal is recorded in an area different from an area where the video signal is normally recorded, the video signal of a higher picture quality can be recorded and reproduced.

In the digital signal recording and reproducing method of the seventh embodiment, first and second signals are error-correcting-encoded respectively, and the inspection codes are recorded in the tracks in a lump. A gap between the first and second signals in the track is no longer needed and the encoding efficiency is improved.

In the digital signal recording and reproducing method of the eighth embodiment, an error-correcting-encoded audio signal is recorded in the vicinity of the track in which the second signal is recorded when the second signal is rewritten in the seventh embodiment. Therefore, it is possible to perform rewriting without changing the error-correcting capability for the second signal.

In the digital signal recording and reproducing method of the ninth embodiment, the first and second signals are separately error-correcting-encoded and recorded in the tracks, and the code length of the error-correcting code for the signal to be rewritten is changed when the first or second signals are rewritten.

In the digital signal recording and reproducing method according to the tenth embodiment of the invention, the code length of the error-correcting code for the signal to be rewritten in the ninth embodiment is shortened. Consequently, the signal, which is not rewritten can be stored, is kept intact.

In the digital signal recording and reproducing method according to the eleventh embodiment, the first and second signals in the seventh, eighth, and ninth embodiments are a video signal and an audio signal, respectively. The portion corresponding to the gap is assigned to the error-correcting code for the audio signal to improve the error-correcting capability of the audio signal.

In the digital signal recording and reproducing method of the twelfth embodiment, the first and second signals in the seventh, eighth and ninth embodiments are an audio signal and a subcode signal, respectively. The portion corresponding to the gap is assigned to the error-correcting code for the subcode signal to improve the error-correcting capability of the subcode signal.

In the digital signal recording and reproducing method of the thirteenth embodiment during normal recording, the video and audio signals are independently error-correcting-encoded, and are recorded in a track with a gap being set in the track. When the post-scoring audio recording is performed, audio and INDEX signals are error-correcting-encoded in a lump and are recorded in a track. In this configuration, a gap between the audio and INDEX signals is no longer needed and the encoding efficiency is improved.

In the digital signal recording and reproducing method of the fourteenth embodiment during the normal recording, the video and audio signals a error-correcting-encoded in a lump and recorded in a track, and when the audio and INDEX signals are rewritten during the post-scoring sound recording, the audio and INDEX signals to be rewritten are error-correcting-encoded in a lump and recorded in a track. In this configuration, the signal can be rewritten without deteriorating the error-correcting capabilities of the portion to be rewritten and without increasing redundancy.

The above and further objects and features of the invention will more fully be apparent from the following detailed description with the accompanying drawings.

BRIEF DESCRIPTION OF THE DRAWINGS

FIG. 4 is a diagram showing an error-correcting code format of a conventional D-2 system for a digital VTR.

FIG. 9 is a diagram showing an error-correcting code format of a digital VTR according to an embodiment of the present invention.

FIGS. 12 (a and b) are diagrams showing another error-correcting code format of a digital VTR according to an embodiment of the present invention.

FIG. 13 is a diagram showing still another tape format of a digital VTR according to an embodiment of the present invention.

DESCRIPTION OF THE PREFERRED EMBODIMENTS

Figure 1:
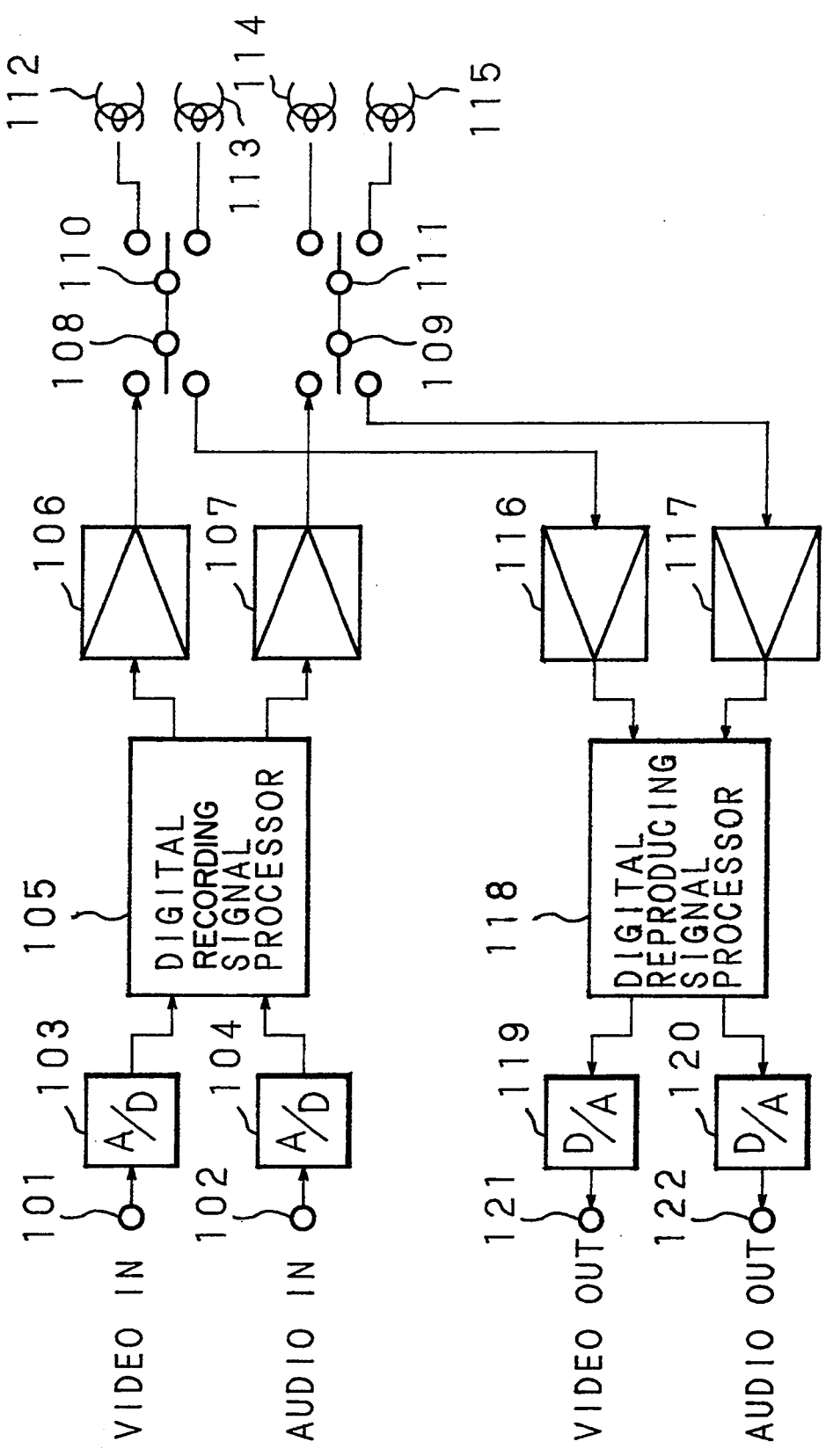
FIG. 1 is a schematic block diagram showing the configuration of a conventional D-2 system for a digital VTR.
Figure 2:
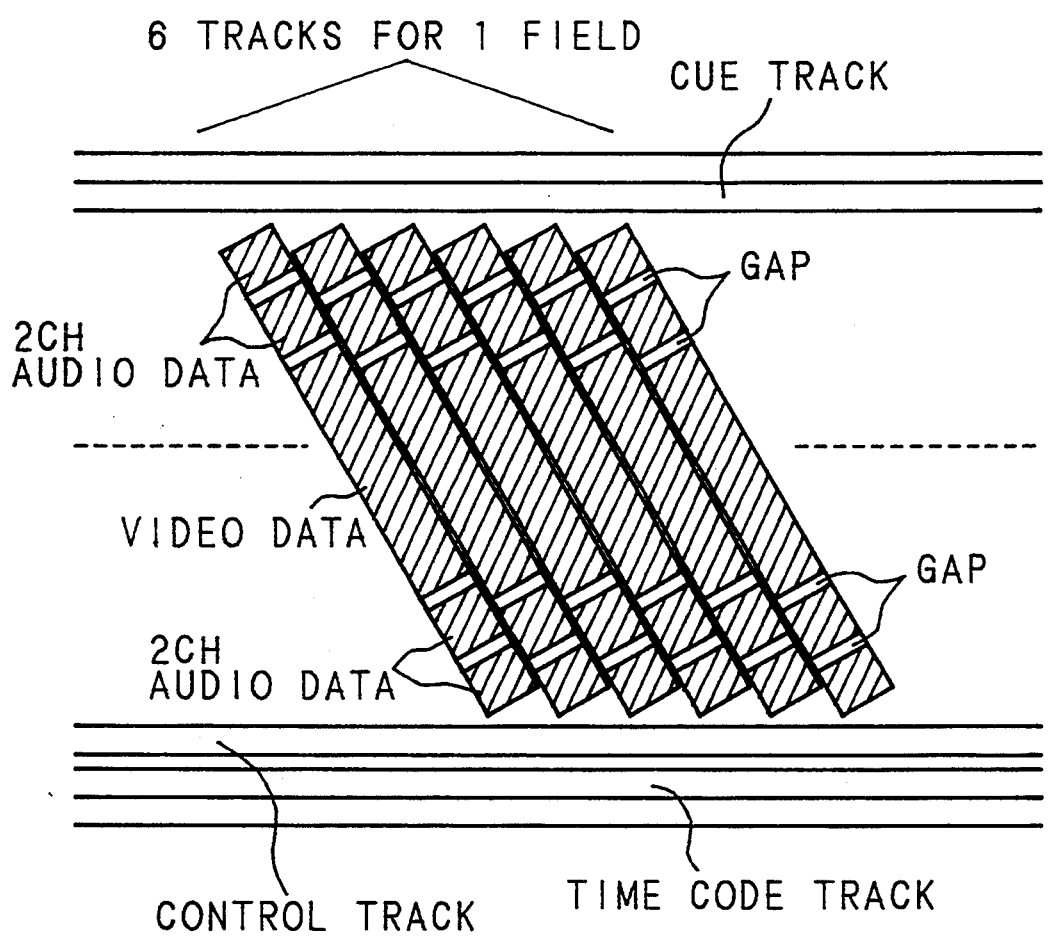
FIG. 2 is a diagram showing a tape format of a conventional D-2 system for a digital VTR.
Figure 3:
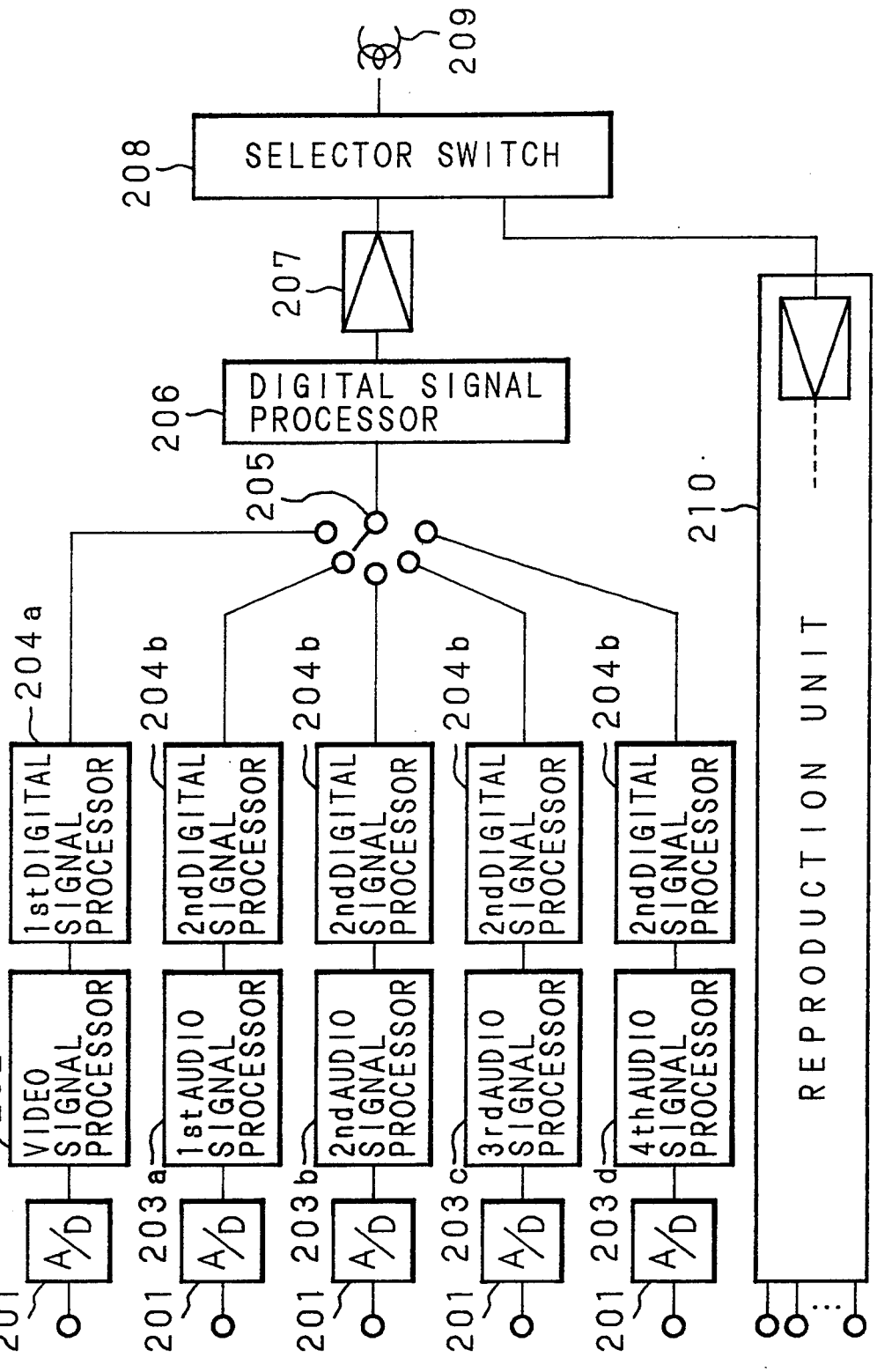
FIG. 3 is a schematic block diagram showing the configuration of another conventional D-2 system for a digital VTR.

Referring to the drawings, embodiments of the present invention will be described in detail hereinafter.

(First embodiment)

Figure 5:
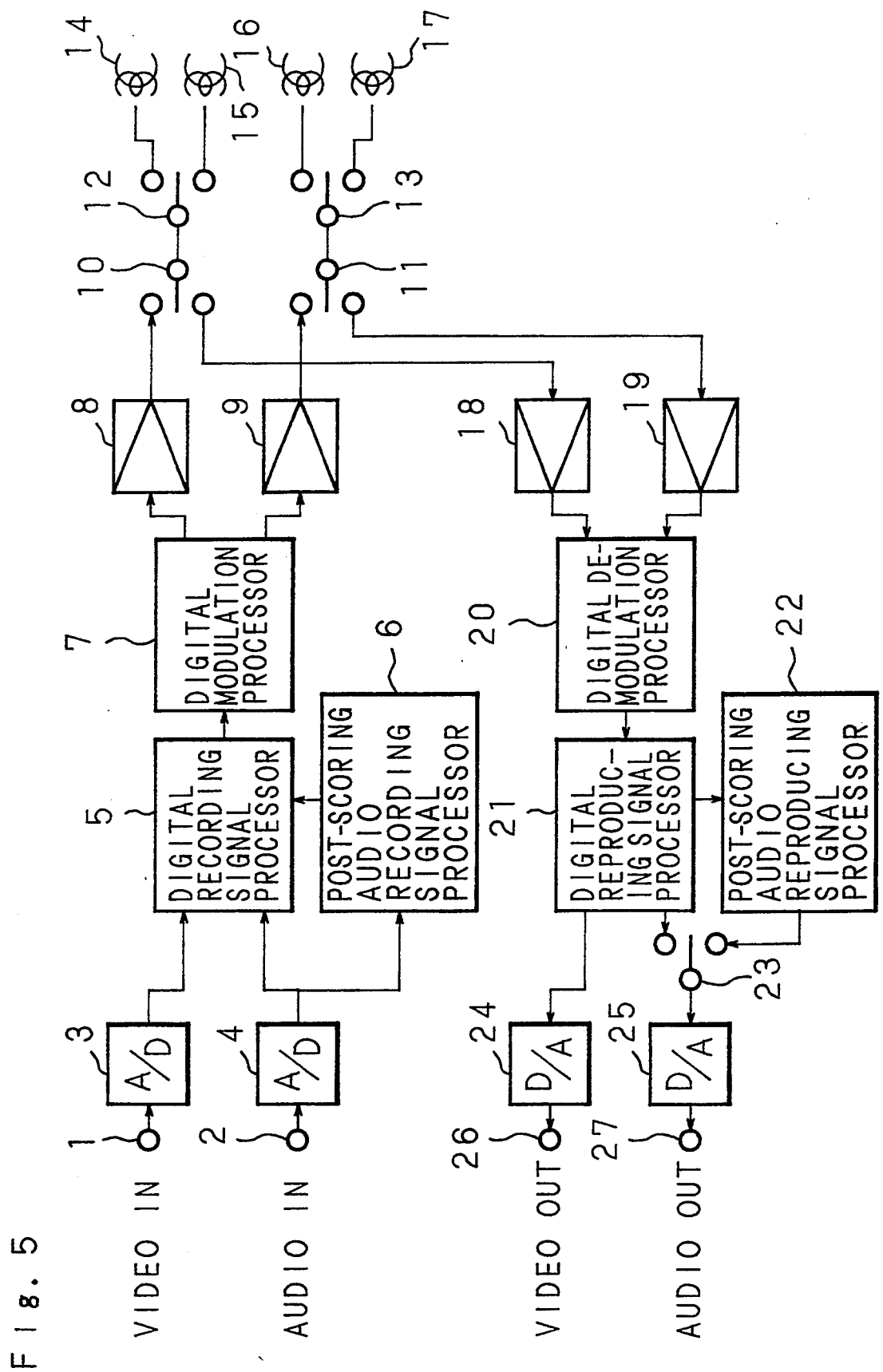
FIG. 5 is a schematic block diagram showing a configuration in an embodiment of a digital VTR according to the present invention.

FIG. 5 is a schematic block diagram showing an embodiment of a home digital VTR according to the present invention. In FIG. 5, numeral 1 is an input terminal for a video signal, and via the input terminal 1, the analog video signal is supplied to an A/D converter 3, and the A/D converter 3 converts the signal to a digital signal and outputs the signal to a digital recording signal processor 5. On the other hand, numeral 2 is an input terminal for an audio signal, and via the input terminal 2, the analog audio signal is supplied to an A/D converter 4, and the A/D converter 4 converts the signal to a digital signal and outputs the signal to the digital recording signal processor 5 and a post-scoring audio recording signal processor 6. The post-scoring audio recording signal processor 6 sends dummy data to the digital recording signal processor 5 during the normal recording and the audio signal for post-scoring to the digital recording signal processor 5 during the post-scoring audio recording. The digital recording signal processor 5 assigns error-correcting codes to the video and audio signals in a lump and outputs the error-correcting-encoded signal to a digital modulation processor 7. The digital recording signal processor 5 separately extracts high-frequency components from the input video signal using, for example, a band limiting filter. The digital modulation processor 7 performs a digital modulation processing and other processing and outputs the processed signal to recording AMPs 8, 9. The recording AMPs 8, 9 amplify the input signal. The amplified signal is distributed to four recording and reproducing heads 14, 15, 16, 17 via recording/reproducing selector switches 10, 11 and via head selector switches 12, 13, and is recorded on a magnetic tape (not shown). Numerals 18–27 show components of the reproduction unit and reproducing AMPs 18, 19 amplify the reproduced signal which is reproduced by the recording and reproducing heads 14, 15, 16, 17 and is supplied via switches 12, 13 and 10, 11, and output the amplified signals to a digital demodulation processor 20. The digital demodulation processor 20 performs digital demodulation and other processing functions and outputs the processed signal to a digital reproducing signal processor 21. The digital reproducing signal processor 21 performs processings such as error-correcting-encoding and outputs the video signal of the normal signal string to a D/A converter 24, while the digital reproducing signal processor 21 outputs the video signal to a D/A converter 25 via a post-scoring selector switch 23 during the normal recording and via the post-scoring audio reproducing signal processor and the post-scoring audio selector switch 23 during the post-scoring audio recording. The D/A converter 24 converts the input signal to the original analog video signal and outputs the analog video signal via an output terminal 26. The D/A converter 25 converts the input signal to the original analog audio signal and outputs the analog audio signal via an output terminal 27.

Figure 6:
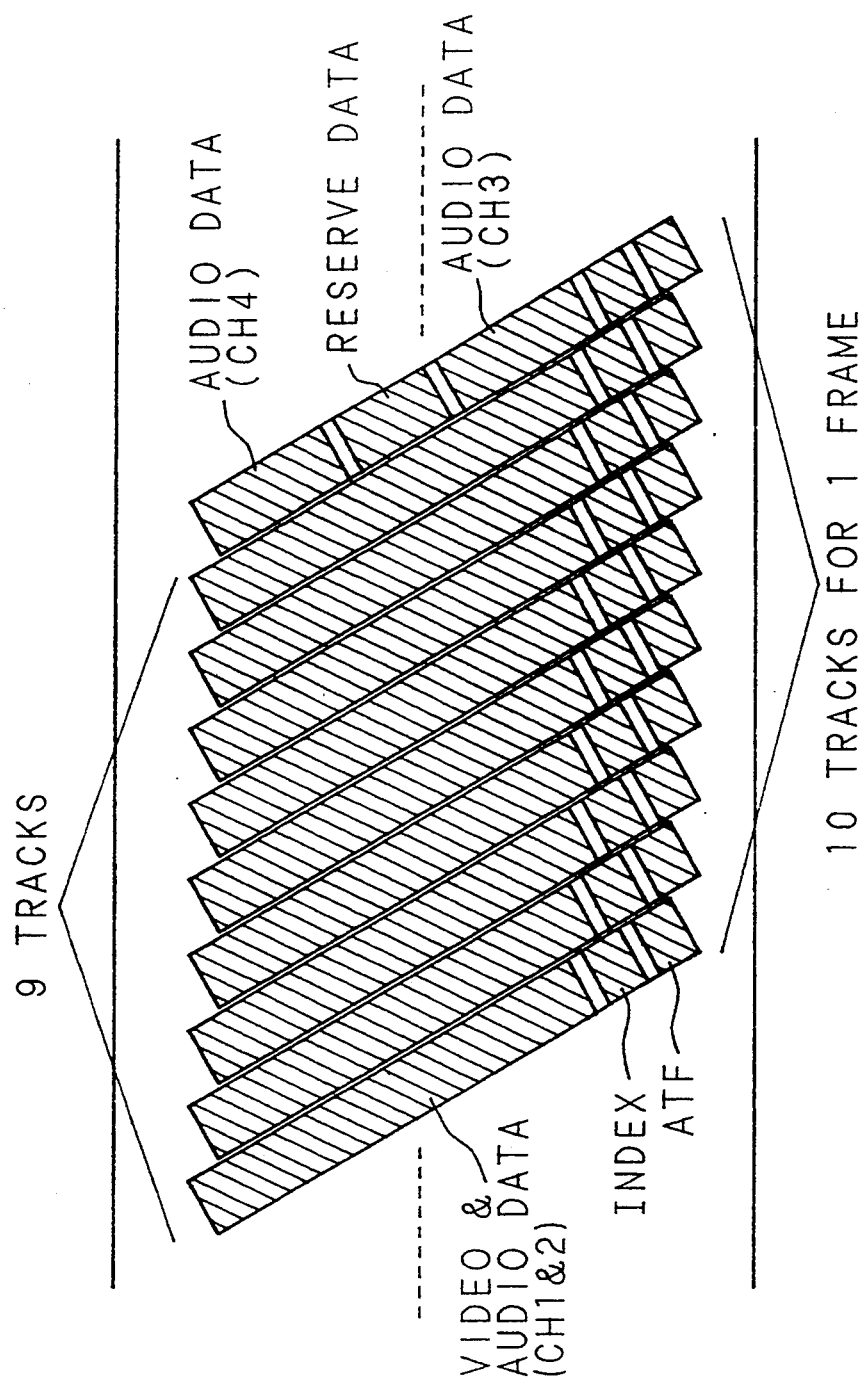
FIG. 6 is a diagram showing a tape format of a digital VTR according to an embodiment of the present invention.

FIG. 6 shows an example of a tape format of a digital VTR according to an embodiment of the present invention. As shown in FIG. 6, in the system according to the present embodiment, the video signal and the four-channel audio signal are digitally recorded in a track tilted in the longitudinal direction of a magnetic tape in the same manner as in the conventional case, but in the present embodiment, ten tracks are provided in the time required for one frame of the video signal, the video signal and the two-channel audio signal are divided and arranged in the nine tracks, and in the remaining one track, the two-channel audio signal and a reserve signal (hereinafter called "reserve data") are arranged to be recorded. An area designated for recording of the control signal for the tape feed (hereinafter called "ATF signal") and the INDEX signal is set in each track.

Now referring to FIG. 5, operations for the digital VTR will be described. First, operations in the normal recording are described. The composite signal supplied to the input terminal 1 is quantized to an 8-bit digital signal at quadruple subcarrier frequencies (14.318 MHz) by the A/D converter 3. The audio signal supplied to the input terminal 2 is quantized to a 16-bit digital signal at 48 kHz by the A/D converter 4. In FIG. 5, the audio signal input is shown in one channel for simplification but, in practice, there are two-channel audio inputs. The video signal and the 2-channel audio signal, which are digitized, are supplied to the digital recording signal processor 5.

On the other hand, at the post-scoring audio recording signal processor 6, the dummy data are formed and sent to the digital recording signal processor 5 as the normal recording is performed.

At the digital recording signal processor 5, the video signal is image-compressed to reduce the data rate of the video signal and necessary time-base processing is performed on the image-compressed video signal and the 2-channel audio signal, which then are divided and arranged in the designated nine tracks of the ten tracks per one frame. To the remaining one track, the dummy data input through the post-scoring audio recording signal processor 6 or data of the high-frequency components extracted from the above-mentioned video signal at the digital recording signal processor 5 are arranged. By the way, whether to arrange the dummy data input through the post-scoring audio recording signal processor 6 or the data of the high-frequency component extracted from the above-mentioned video signal to the remaining one track is decided by the image quality selector key (not shown) and the information is recorded about which signal is arranged with the INDEX signal flag. In addition, an error-correcting mode is assigned to each track. The data string to which the error-correcting code is assigned is sent out to the digital modulation processor 7.

By integrating the video and audio signals during the normal recording as described above and performing the error-correcting-encoding in which the error-correcting codes are assigned to the overall integrated data simultaneously, it is possible to form codes with better encoding efficiency and higher correcting capability when compared to the conventional process in which the error-correcting code is assigned separately to the video and audio signals. Particularly, since the video signal has a larger volume of data than the audio signal, this configuration is extremely effective for the audio signal.

At the digital modulation processor 7, the INDEX signal is assigned to each track of the data string sent out from the digital recording signal processor 5, while the digital modulation is performed in accordance with a specified modulation system. In addition, to each track of the digital-modulated data string, the ATF signal is assigned.

The output signal of the digital modulation processor 7 is passed through the recording AMPs 8, 9, distributed to the recording and reproducing heads 14, 15, 16, 17, respectively, by the head selector switches 12, 13 and the recording/reproducing selector switches 10, 11, and are recorded on a magnetic tape in accordance with the tape format shown in FIG. 6.

Signal reproduction is performed as follows. The signal reproduced by the recording and reproducing heads 14, 15, 16, 17 is passed through the head selector switches 12, 13 and through the recording/reproducing switches 10, 11, amplified at the reproducing AMPs 18, 19, and then, supplied to the digital demodulation processor 20. At the digital demodulation processor 20, the ATF signal is extracted from each track and sent out to the servo circuit (not shown) while the data string of each track is digital-demodulated. The digitally demodulated data string is sent to the digital reproducing signal processor 21.

At the digital reproducing signal processor 21, the error-correcting processing is performed on the digital-demodulated data string to be entered. In addition, the video signal and the 2-channel audio signal are extracted from designated nine tracks out of a 10-track unit, and at the same time, when the INDEX signal indicates that the post-scoring audio data are recorded, the data of the remaining one track of a 10-track unit are sent out to the post-scoring audio reproducing signal processor 22. The extracted video signal is restored to the original video signal by the compression-restoration processing. When the INDEX signal indicates that a high-frequency component data of the video signal is recorded, the data of the remaining one track of a 10-track unit and this compression-restored video data are added to restore the original video signal. The extracted 2-channel audio signal is restored to the original 2-channel audio signal by a specified time-base processing.

As described above, by recording the high-frequency component data, which is a part of the video signal, in another recording area than that for the normal video signal, a higher image-quality video signal can be reproduced.

At the post-scoring audio reproducing signal processor 22, the input data from the digital reproducing signal processor 21 is identified as dummy data. This identification process can determine that there is no audio data for the post-scoring in this track. The configuration is designed to allow the post-scoring audio selector switch 23 to constantly select audio data from the digital reproducing signal processor 21 by this judgment. Thus, consideration is given so that users can select and listen to post-scored sound by the post-scoring audio selector key (not shown) and that, if the post-scoring sound is not recorded even when users select the post-scoring sound, normal sound is outputted automatically. If any post-scoring audio signal is recorded on a magnetic tape, the input data from the digital reproducing signal processor 21 contains 2-channel audio signals for the post-scoring. Therefore, time-base processing is carried out at this post-scoring audio reproducing signal processor 22 and the audio signal is restored to the original 2-channel audio signal for the post-scoring to be sent out. It is also possible to decide whether any post-scoring audio signal is recorded or not by setting a flag in the INDEX signal.

The video signal sent out from the digital reproducing signal processor 21 is D/A-converted by the D/A converter 24 to the original video signal. If no post-scoring sound is selected by users using the post-scoring audio selector key, the 2-channel audio signal sent out from the digital reproducing signal processor 21 is D/A converted by the D/A converter 25 via the post-scoring audio selector switch 23 and the original 2-channel audio signals are reproduced. If users select the post-scoring sound by the post-scoring audio selector key and the 2-channel audio signal for post-scoring is reproduced, the 2-channel audio signal for the post-scoring sent out from the post-scoring audio reproducing signal processor 22 is D/A-converted by the D/A converter 25 via the post-scoring audio selector switch 23 and the original 2-channel audio signal for the post-scoring can be obtained. Though it is not shown in FIG. 5, the configuration is so designed that if no reproduced outputs are obtained from the reproducing AMPs 18, 19, the output video and audio signals are muted.

Next, an operation for the post-scoring audio recording will be described. By operating a post-scoring recording key (not shown), a post-scoring recording mode is obtained. By operating a reproducing key (not shown) in the post-scoring recording mode, the post-scoring audio recording starts after a specified time. In the post-scoring recording mode, at the post-scoring audio recording processor 6, the two-channel audio signal inputted is time-base-processed, divided and arranged in a designated track of a track array of ten tracks. These signals are sent to the digital recording signal processor 5.

By operating the reproducing key, a magnetic tape begins running. The running of a magnetic tape is controlled by using the ATF signal reproduced from each track. The video and 2-channel audio signals reproduced from the designated nine tracks of a track array of ten tracks are signal-processed in the same manner as in a normal reproduction and the reproduced video signal is outputted through the output terminal 26. After the reproducing key is operated, the post-scoring audio recording is resumed from a specified position of a magnetic tape.

The two-channel audio signal for the post-scoring sent out from the post-scoring audio recording processor 6 is signal processed as in the normal recording at the digital recording signal processor 5 and the digital demodulation processor 7 and is supplied to the recording AMP 9. The two-channel audio signal is overwritten to be recorded in a designated track of a track array of ten tracks on a magnetic tape by changing over properly either the recording/reproducing selector switch 11 and the head selector switch 13. Thus, the post-scoring audio recording can be effected.

When DCT (Discrete Cosine Transform) encoding is used by the image compressing system to reduce the video data rate to about 25 Mbps, and when a system in which the error-correcting code is assigned independently to the video signal and the two-channel audio signal, as in a conventional system, is employed, the recording data rate after the error-correcting code assigning reaches about 38 Mbps. On the other hand, according to the system in the first embodiment, the recording data rate of about 38 Mbps, a similar level that can be achieved with the conventional system, can be achieved even when the video and two-channel audio signals during the normal recording are integrated with the error-correcting code assigned to them, and then, the two-channel audio signal for the post-scoring, which is integrated with the reserve signal having the error-correcting code assigned to them, are added.

Unlike apparatuses for business use, in apparatuses for private use, user-friendliness is essential. Consequently, the audio signal is not necessarily recorded and reproduced channel by channel and may be recorded and reproduced at the unit of two channels.

In this embodiment, the video and audio signals for one frame are divided and arranged in a track array of ten tracks but the video and audio signals for one frame may be divided and arranged in a track array of N tracks (N represents a positive integer) depending on the type of the input video signal (for example, NTSC, PAL, etc.) or the electromagnetic performance of the magnetic tape and the magnetic head.

In this embodiment, one track out of a track array of ten tracks is designated as a track exclusively for the post-scoring but a plurality of tracks may be designated.

According to this first embodiment, since the video signal is recorded together with the two-channel audio signal during the normal recording and the two-channel audio signal is recorded in a track designated for the post-scoring audio recording during the post-scoring audio recording, even if users fail to properly operate the post-scoring audio recording, the two-channel audio signal recorded during the normal recording is not erased, which allows users to repeat the post-scoring audio recording over and over so that a system friendly to users can be constructed.

(Second embodiment)

Figure 7:
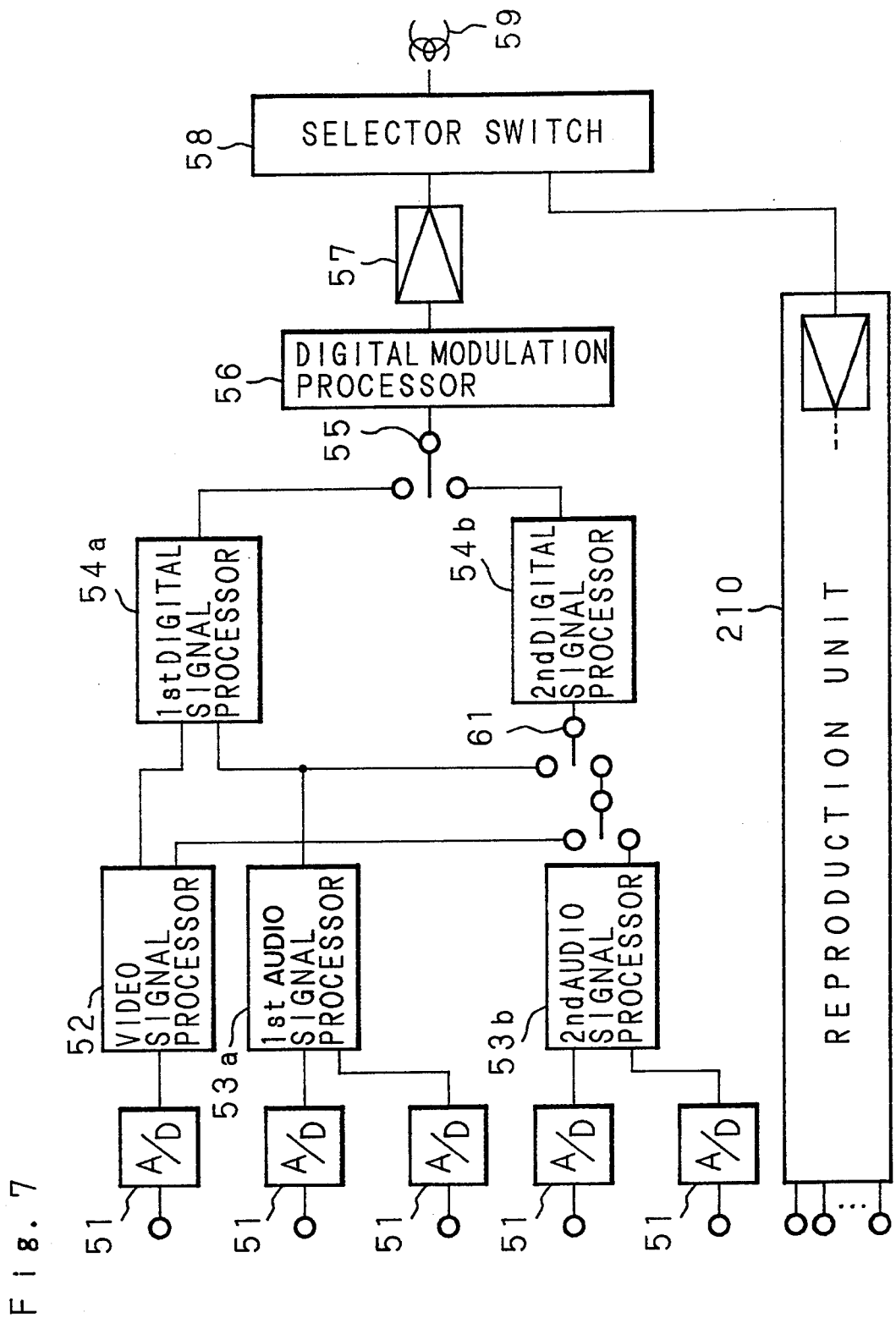
FIG. 7 is a schematic block diagram showing a configuration in another embodiment of a digital VTR according to the present invention.
Figure 8:
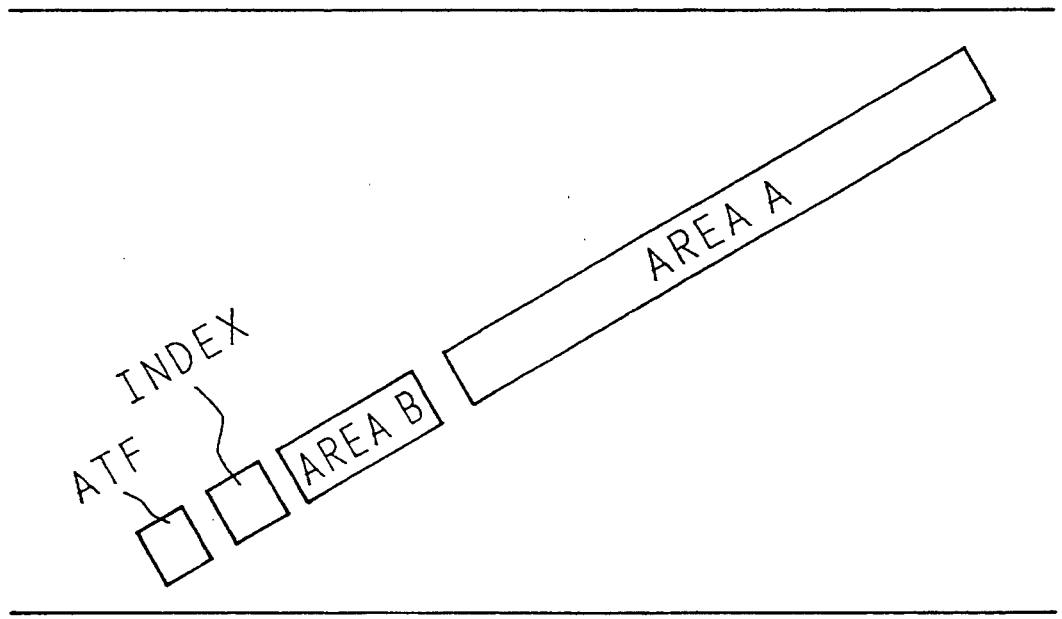
FIG. 8 is a diagram showing another tape format of a digital VTR according to an embodiment of the present invention.

FIG. 7 is a schematic block diagram showing another configuration of a home digital VTR according to the present invention, while FIG. 8 is a diagram showing a tape format in accordance with an embodiment of the present invention. First of all, during the normal recording of the video/audio signals, the video signal is supplied to a video signal processor 52 via an A/D converter 51, sampled at 4 $f_{sc}$, time-base-processed, data-compressed by DCT if compression is needed, and then, outputted to a first digital signal processor 54a. In the meantime, the audio signal passed through an A/D converter 51 is sampled and digitized at a first audio signal processor 53a and outputted to the first digital signal processor 54a. At the first digital signal processor 54a, the video and audio signals are integrated and the error-correcting code is assigned to them collectively. The error-correcting-encoded data is recorded as a magnetized pattern in an area A on a magnetic tape shown in FIG. 8 by a recording and reproducing head 59 via a switch 55, a digital modulation processor 56, a recording AMP 57, and a recording/reproducing selector switch 58. In the remaining area B, dummy data supplied from a second audio signal processor 53b or high-frequency component data extracted from the above-mentioned video signal and supplied from the video signal processor 52 are sent from the second digital signal processor 54b to be recorded.

On the other hand, during the post-scoring audio recording, the two-channel audio signals for the post-scoring passed through an A/D converter 51 pass through the second audio signal processor 53b and are error-correcting-encoded by the second digital signal processor 54b. The error-correcting-encoded data are recorded as magnetized pattern in the area B on a magnetic tape shown in FIG. 8 by the recording and reproducing head 59 as in the normal recording.

Other details of the operation during recording are the same as those described in the above first embodiment, and therefore, the description is omitted. In the reproducing operation, the process takes steps in a reverse manner to those in recording, and therefore, the description is also omitted.

In the format shown in FIG. 8, the video and four-channel audio signals are digitally recorded in a track tilted in the longitudinal direction of a magnetic tape as in conventional embodiments. In the area A, the video and two-channel audio signals are divided an arranged, while in the area B, the two-channel audio signal and reserve data are arranged and recorded. The area designated for recording of the ATF and INDEX signals are set in each track. Because the video and audio signals can be error-correcting-encoded in a lump during the normal recording, highly efficient code correction is achieved. A gap used for recording the video and audio signals separately is no longer needed. In addition, it has an advantage that the post-scoring area can be freely used for signals other than the post-scoring audio signal due to this format.

FIG. 9 shows a format in which video and audio data are error-correcting encoded according to the second embodiment and a format in which the post-scoring audio data is error-correcting-encoded, respectively. As the comparison with the conventional method illustrated in FIG. 4, the information area consists of the D-2 format video and the audio data with the data volume amounts to $85 \times 64 + 85 \times 8 \times 4 = 8160$ bytes and the overall format, in which these data are encoded, the data volume amounts to $93\times68+93\times12\times4=10788$ bytes. On the other hand according to the embodiment shown in FIG. 8, the information area consists of the same number of bytes, $85\times80+85\times16=8160$ bytes, but the total of the encoded data amounts to $93\times84+93\times20=9672$ bytes, which is 1116 bytes less than that of the conventional system. The random error-correcting capabilities may be the same because the synthetic distance is $9\times5=45$ for both cases if the Reed-Solomon code on GF ($2^8$) is used. The burst correcting capabilities are equal also. Consequently, the present embodiment is superior and nearly identical correcting capability can be obtained with less redundancy.

In this embodiment, a single area B in the track is designated as an exclusive area for the post-scoring but a plurality of areas may be provided for this purpose.

As described above, in this second embodiment, the video and audio signals are error-correcting-encoded in a lump, and are recorded in a fixed area on a track while the post-scoring audio signal is error-correcting-encoded separately and is recorded in a different area on the track. Therefore, only one place is required to provide a gap clearance and in comparison to the conventional system, a system with a high error-correcting encoding efficiency, less possibility of post-scoring recording failures, and a higher efficiency can be constructed.

A track designated for the post-scoring and an area B designated for the post-scoring in the first and the second embodiments can be used for various applications including, for example, recording a high-quality still image signal as shown, in the Japanese Patent Application No. 2-248465 "Animation/Still Picture Simultaneous Recording and Reproducing Apparatus."

Next, another embodiment of the present invention will be explained below. The configuration of the digital VTR in each embodiment shown below is the same as FIG. 5 (first embodiment).

(Third embodiment)

Figure 10:
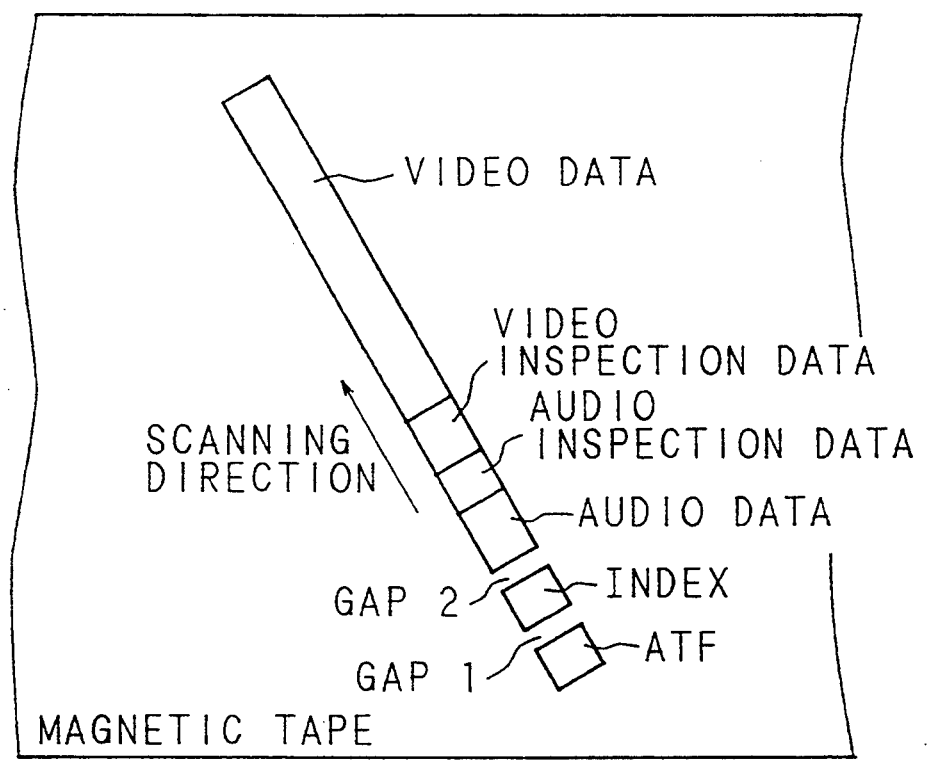
FIG. 10 is a diagram showing still another tape format of a digital VTR according to an embodiment of the present invention.

FIG. 10 is a diagram showing a tape format according to the third embodiment. In the system according to the third embodiment as shown in FIG. 10, three areas are provided so that the ATF signal, a special recording area signal of the INDEX signal (an example of a subcode signal), the video signal and the two-channel audio signal are digitally recorded sequentially in the head scanning direction. Between the ATF and INDEX areas and the INDEX and the video+audio areas, a gap is provided, respectively.

In the digital recording signal processor 5, as described above, the video signal is image-compressed, and necessary time-base processing is performed on the image-compressed video signal and the two-channel audio signal. Then, the signals are divided and arranged, for example, in ten tracks per one frame. Error-correcting encoding is performed in each track but encoding is performed on the video, audio, and INDEX signals, separately. Then, data such as the signal for retrieval and the number of channels of the audio signal are recorded in the INDEX signal. The data string to which the error-correcting code is assigned is sent out to the digital modulation processor 7. At the digital modulation processor 7, the ATF signal is added to each track of the data string sent from the digital recording signal processor 5 and the digital modulation process is performed in accordance with a specified modulation system. The ATF signal may be added after the digital modulation process is carried out.

Now, the error-correcting code for data to be recorded on a magnetic tape will be explained using FIGS. 12 (a) and (b). FIG. 12 (a) shows a configuration of the error-correcting code for the video and audio signals during the normal recording. The error-correcting code is, in general, frequently dual-encoded, and in such a case, after an outer encoding (also called a C2 encoding) is performed on each data, an inner encoding (also called a C1 encoding) is performed. Now, the audio and video data are two-dimensionally arranged in $k_1\times k_2$ and in $k_1\times k_3$, respectively. The audio signal is encoded into C1: ($n_1$, $k_1$, $d_1$), C2: ($n_2$, $k_2$, $d_2$), and the video signal is encoded into C1: ($n_1$, $k_1$, $d_1$), C2: ($n_3$, $k_3$, $d_3$), where n is a code length, k is an information length, and d is a distance between codes. The encoded data are scanned from the lower left to the right in FIG. 12 (a) and form a track by repeating this operation $n_2+n_3$ times. In FIG. 10, an outer encoded area is shown as inspection data. On the INDEX signal, similar error-correcting coding is performed (not shown). As shown in FIG. 12(a), because no gap is provided between audio inspection data (an outer code) and video inspection data (an outer code), the length of the inspection code can be increased by the gap length, and thus, the error-correcting capability can be improved.

The audio data for the post-scoring is error-correcting-encoded as in the normal recording. At the track in FIG. 10, the audio data and the audio inspection data are rewritten. The timing for rewriting is determined by estimating from the timing to reproduce the ATF and INDEX signals and obtaining the recording mode. Consequently, positioning is performed properly but not accurately, and a part of the video inspection data may be impaired. However, because for the normal video data, a strong error-correcting code is used, errors of only one or two inner codes may occur, almost all of such errors can be corrected. Even if correction is impossible, errors which occur in the inspection data and the video data are scarcely affected.

(Fourth embodiment)

Figure 11:
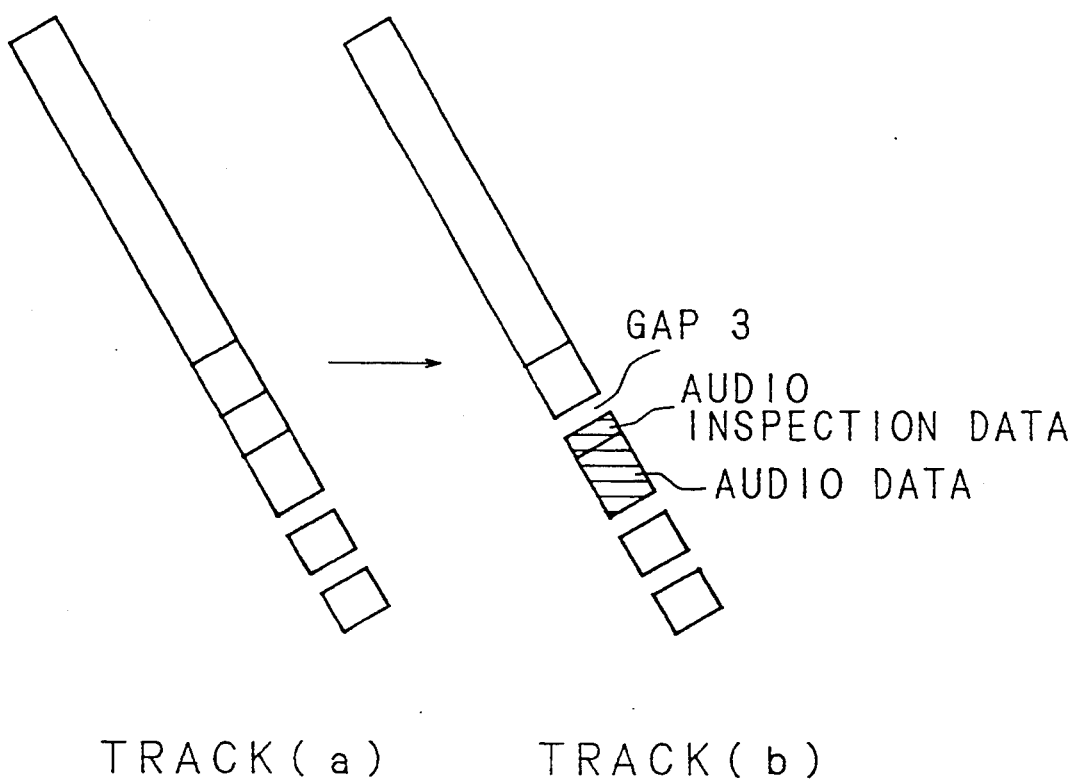
FIG. 11 is a diagram showing another tape format of a digital VTR according to an embodiment of the present invention.

Using a track pattern diagram in FIG. 11, the fourth embodiment will be explained. The track (a) in FIG. 11 shows a track pattern during the normal recording and the track (a) is the same as that in FIG. 10. When the post-scoring audio recording is carried out, a gap 3 is created by shortening the code length of the audio signal as shown in the track (b). That is, as shown in FIG. 12 (b), by shortening the code length of the outer code (C2) gap 3 can be produced. In this case, the correcting capability for the audio data is lowered but no video data is damaged. The gap 3 exists in the same manner as in conventional embodiments and the same correcting capability is obtained for the audio signal. Because almost all portions to be post-scored are usually a part of the recorded signal, the remaining part of the audio data can be stored with a high correcting capability being ensured. In addition, if the post-scoring audio signal is not normally reproduced, the post-scoring can be done over again.

Information that the post-scoring code length is changed should be stored in the same place after synchronizing and the ID signals are added, when, for example, one of the C1 codes in FIG. 12 (a) are formed as an ID signal. In FIG. 5, this ID signal is detected and processing of the audio signal can be performed at the post-scoring audio reproducing signal processor 22.

When the code length for the audio signal is varied, by shortening the code length, the gap 3 can be produced and it is convenient but conversely, by increasing the code length, it is also possible to improve the error-correcting capability. This is effective when the error rate during the post-scoring audio recording is higher than that during the normal recording.

(Fifth embodiment)

Using a track pattern diagram in FIG. 13, the fifth embodiment will be explained. In the track (a) in FIG. 13, the audio signal and the INDEX signal are error-correcting-encoded in a lump. This brings a condition in which the gap 2 is not present. Now, the case in which the INDEX signal is post-scored is considered. As in the case of the track (b) in FIG. 13, by recording the INDEX signal of a shortened code length, the gap 2 can be produced. In this case, the audio signal in the back is not affected at all. The INDEX signal is rewritten when, for example, the retrieval signal is recorded later.

(Sixth embodiment)

Figure 14:
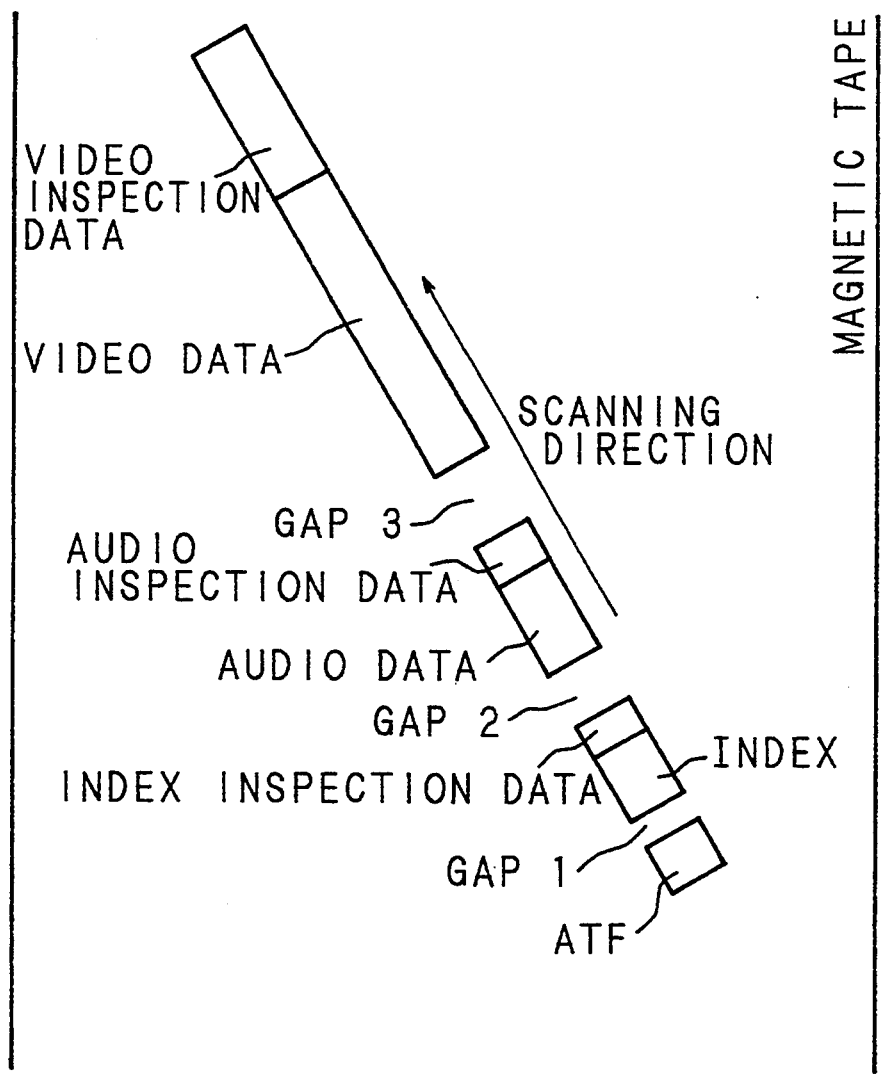
FIG. 14 is a diagram showing a further tape format of a digital VTR during the normal recording according to an embodiment of the present invention.
Figure 15:
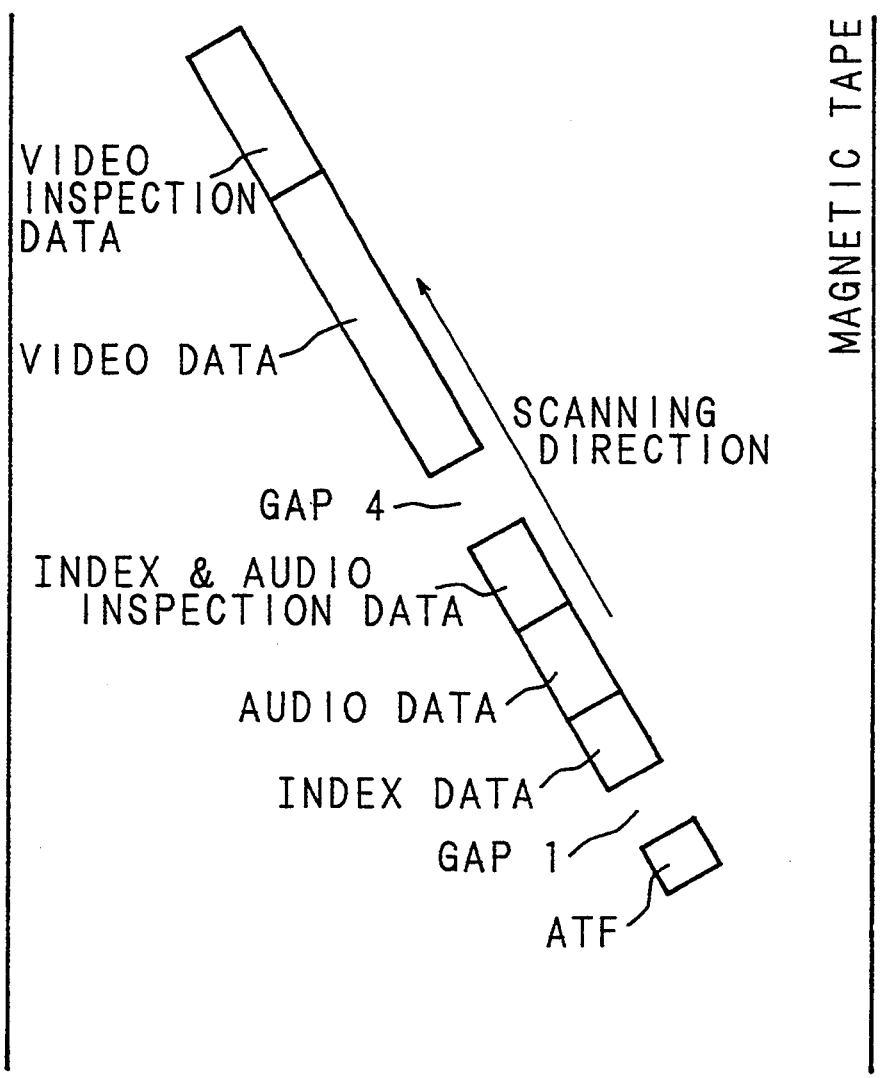
FIG. 15 is a diagram showing a still further tape format of a digital VTR during the post-scoring audio recording according to an embodiment of the present invention.
Figure 16:
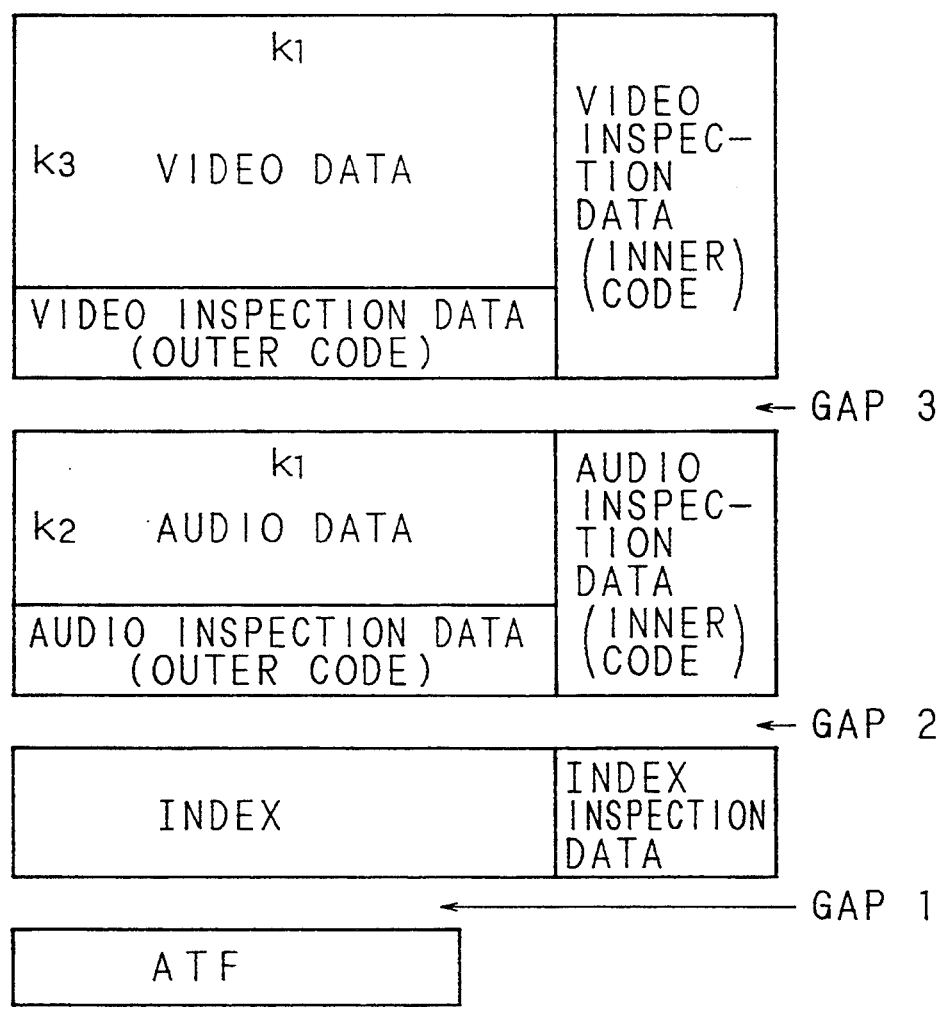
FIG. 16 is a diagram showing another error-correcting code format of a digital VTR during the normal recording according to an embodiment of the present invention.
Figure 17:
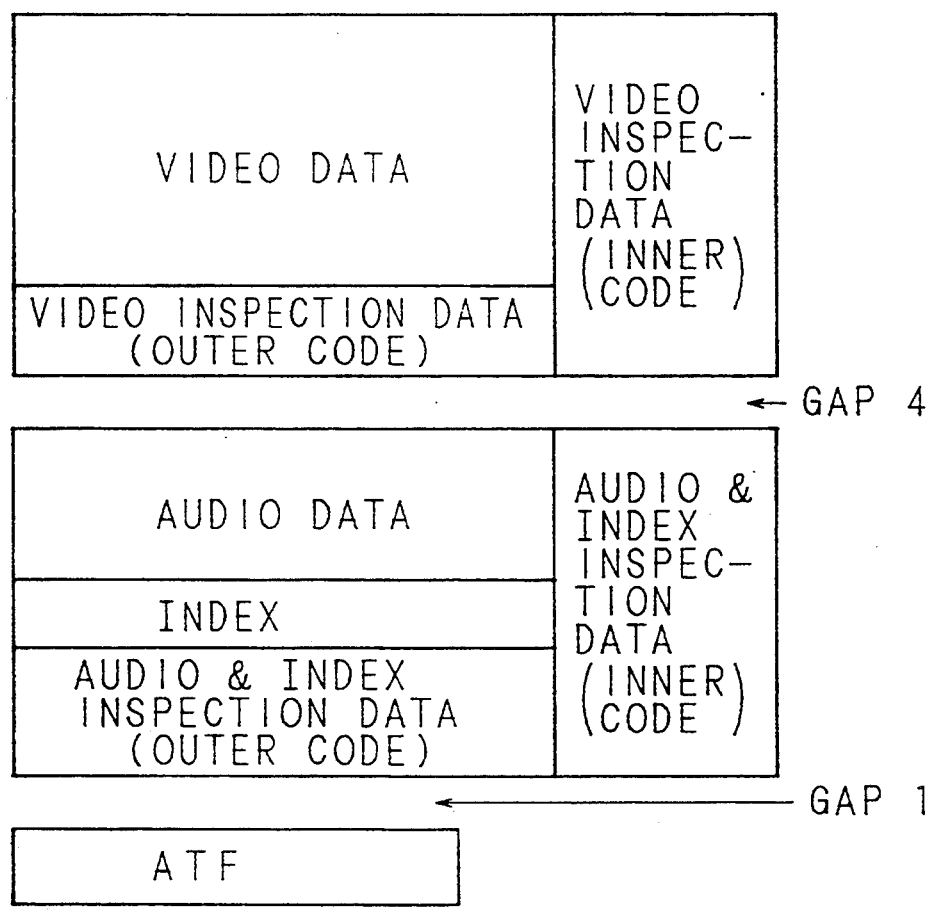
FIG. 17 is a diagram showing another error-correcting code format of a digital VTR during the post-scoring audio recording according to an embodiment of the present invention.

FIG. 14 shows a track format on a magnetic tape during the normal recording according to the sixth embodiment and FIG. 15 shows a track format on a magnetic tape during the post-scoring audio recording. FIG. 16 shows an error-correcting code format during the normal recording according to the sixth embodiment and FIG. 17 shows an error-correcting code format during the post-scoring audio recording. In the system used in the sixth embodiment as shown in FIGS. 14 and 16, four areas are provided during the normal recording, in which the ATF signal, the special recording area signals for the INDEX signal, the audio signal, and the video signal are digitally recorded in that order in the head scanning direction. Between the ATF area and the INDEX area and the audio area and the video area, the gaps 1, 2, 3 are provided respectively. On the other hand, during the post-scoring audio recording as shown in FIGS. 15 and 17, the inner-code and the outer-code inspection data are added to the INDEX signal and the audio signal in a lump, and the gaps 1, 4 are provided between the ATF and INDEX areas and the audio and video areas, respectively, reducing the number of gaps by one as compared to the normal recording. Thus, an adjustment of the timing difference caused by the post-scoring is effected.

(Seventh embodiment)

Figure 18:
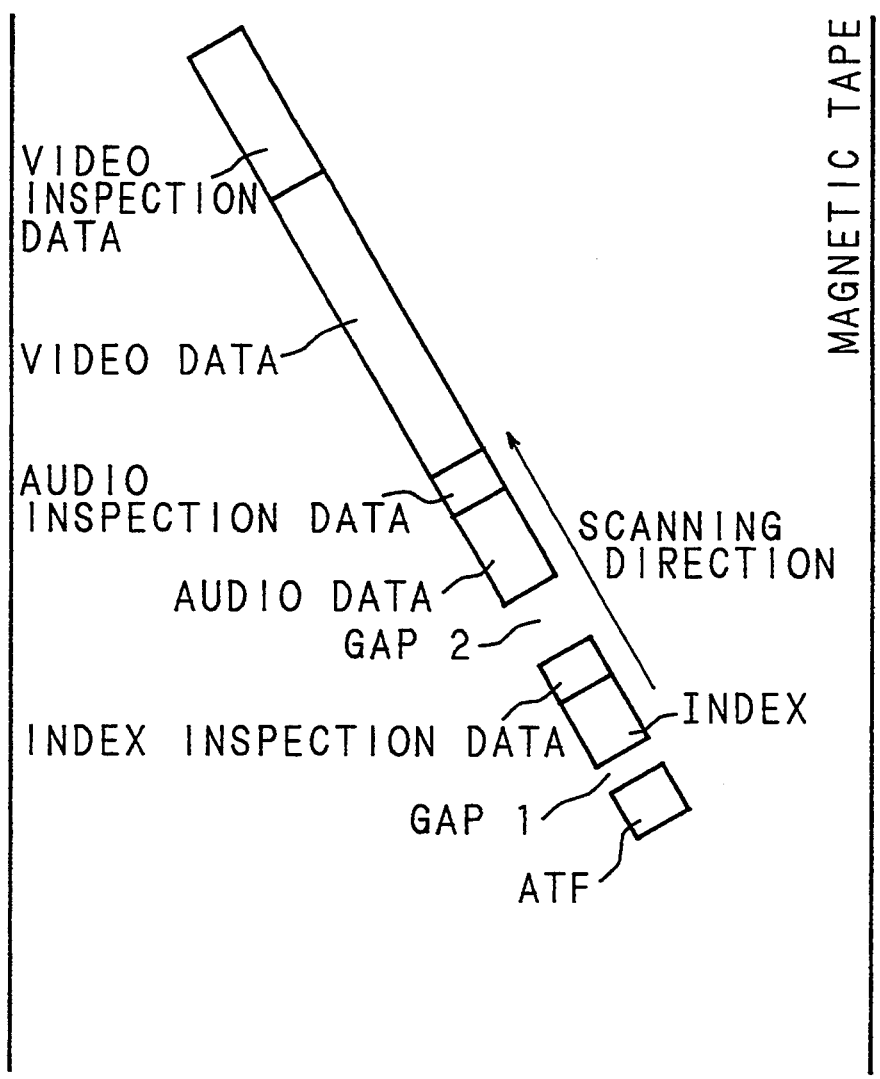
FIG. 18 is a diagram showing another tape format of a digital VTR during the normal recording according to an embodiment of the present invention.
Figure 19:
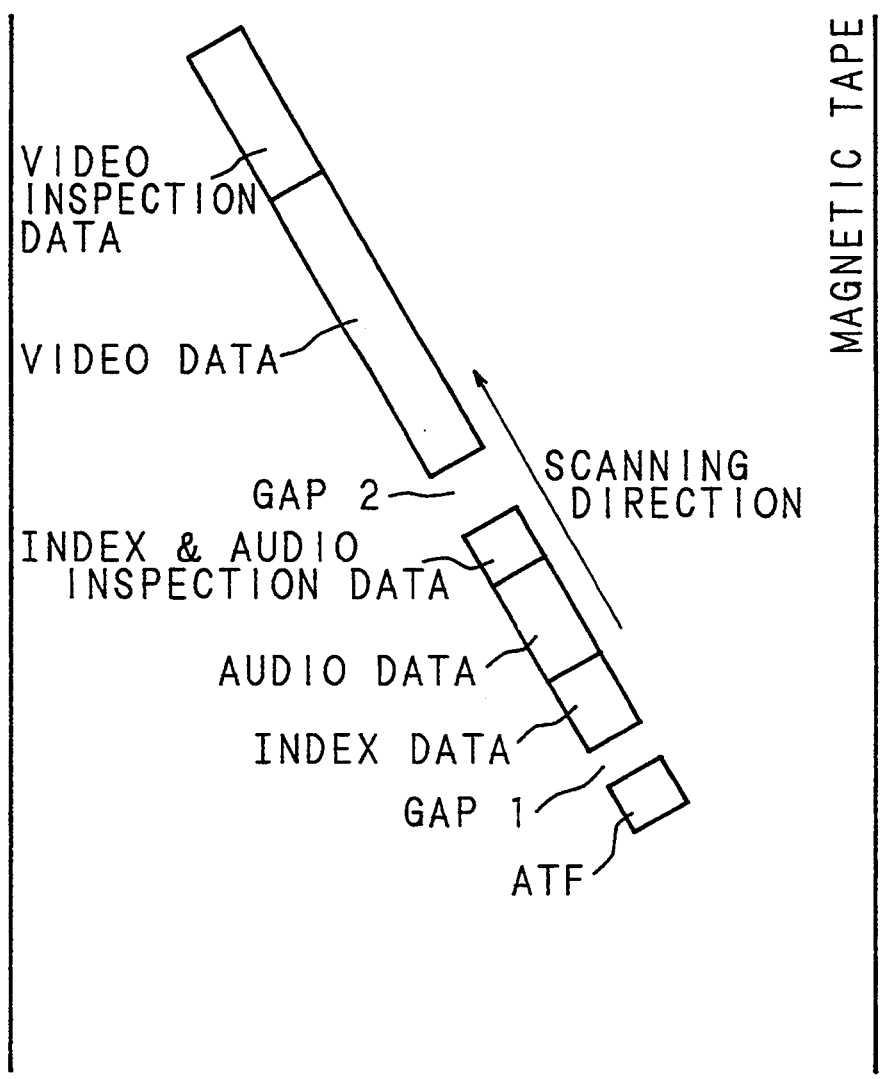
FIG. 19 is a diagram showing still another tape format of a digital post-scoring audio recording VTR according to an embodiment of the present invention.
Figure 20:
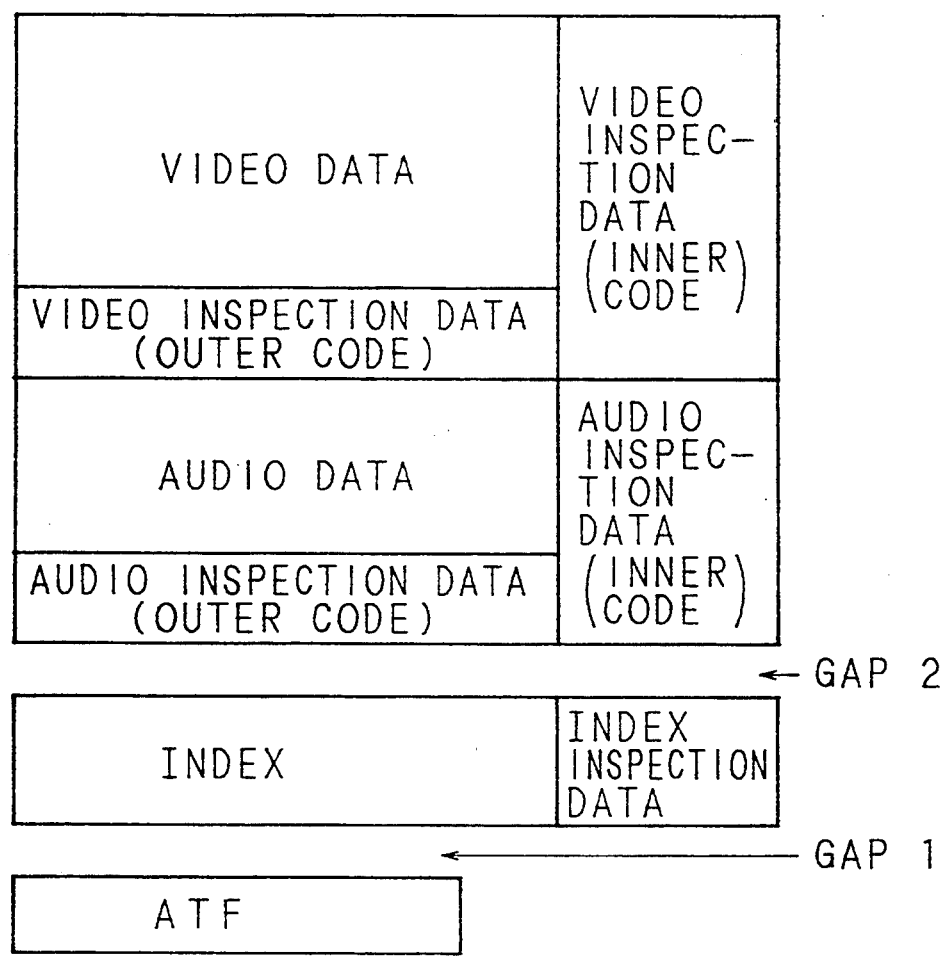
FIG. 20 is a diagram showing still another error-correcting code format of a digital VTR during the normal recording according to an embodiment of the present invention.
Figure 21:
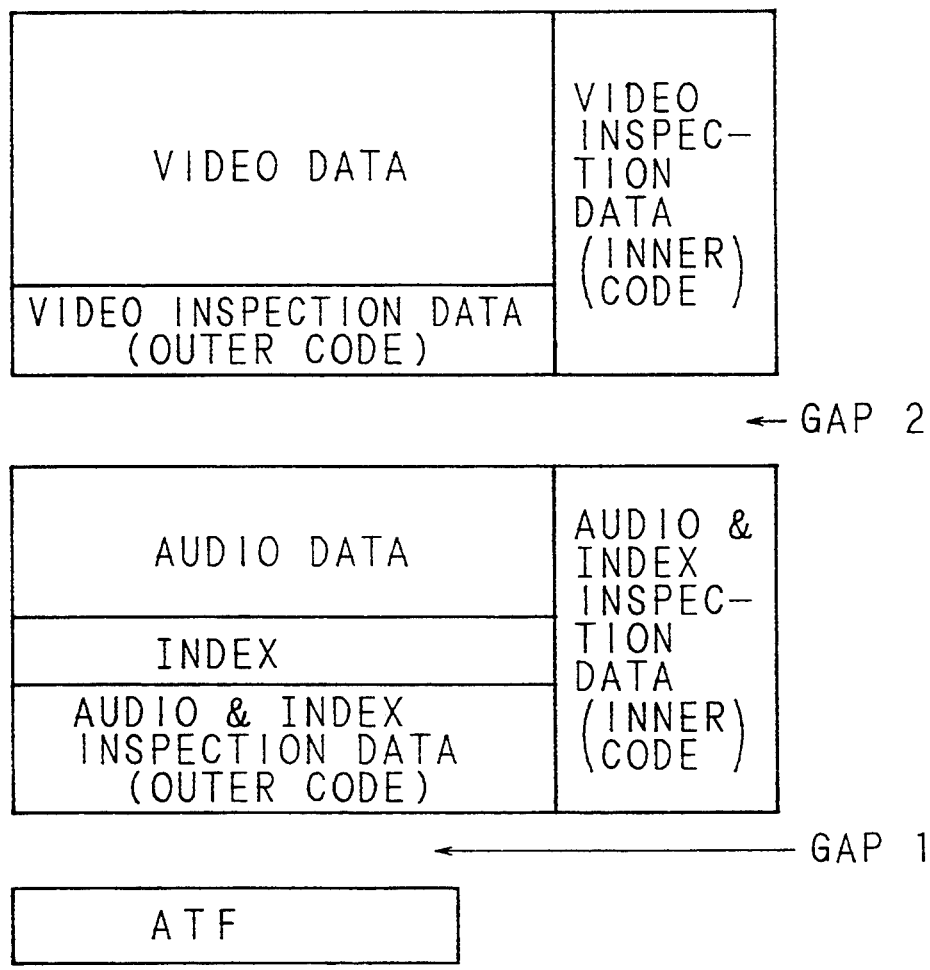
FIG. 21 is a diagram showing another error-correcting code format of a digital VTR during the post-scoring audio recording according to an embodiment of the present invention.

FIG. 18 shows a track format on a magnetic tape according to the seventh embodiment during the normal recording, and FIG. 19 shows a track format on a magnetic tape during the post-scoring audio recording. FIG. 20 shows an error-correcting code format according to the seventh embodiment during the normal recording, and FIG. 21 shows an error-correcting code format during the post-scoring audio recording. During the normal recording as shown in FIGS. 18 and 20, the audio signal and the video signal are error-correcting-encoded in a lump. In this case, there is no gap between the audio and video signals. Now, consideration is given to the case in which the audio signal is post-scored. As shown in FIGS. 19 and 21, by recording the INDEX and audio signals in a lump a gap can be produced. In this case, the video signal in the back is not affected at all.

In the above third through seventh embodiments, processes are explained which use the video, audio, and INDEX signals as examples, but the same explanation will be applied to any data if they are related to one another.

In each embodiment, the two-channel audio signal for the normal recording an the two-channel audio signal for the post-scoring are designed to be recorded without audio-compression, but they may be audio-compressed and recorded and the signals are not necessarily two-channel signals.

In each embodiment, the input video signal is designed to be quantized to an 8-bit digital signal at a quadruple subcarrier frequency (14.318 MHz) by the A/D converter. The composite method for A/D converting a luminance signal Y and a color signal C in the frequency-multiplexed form as an analog NTSC signal often quantizes the signal by the quadruple subcarrier frequency. The component method quantizes and A/D converts a luminance signal Y and two chrominance signals Cr and Cb independently as they are and then quantizes them respectively so as to be digital signals as seen in CCIR Rec 601. According to the component method, the ratio of frequency components of Y, Cr and $C_b$ is 4:2:2 in CCIR Rec 601.

In each embodiment, the input audio signal is designed to be converted into a 16-bit digitized signal with a sampling frequency of 48 kHz by the A/D converter, but it may be so configured that the input audio signal is converted, for example, to a 12-bit digitized signal with a sampling frequency of 32 kHz, or to a 16-bit digitized signal with a sampling frequency of 44.1 kHz.

In each embodiment, a part of the video signal to be extracted is explained using a high-frequency component but needless to say, it may be a low-frequency component, a DC component, data for motion compensation, or data for editing or special reproduction.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A digital signal recording and reproducing apparatus for digitally recording a video signal and an audio signal, comprising:

a video signal recording processor for receiving and processing the video signal;

a first audio signal recording processor for processing a first portion of the audio signal;

a second audio signal recording processor for processing a second portion of the audio signal and generating recording dummy data during normal recording;

a first signal recording processor for integrating the video signal processed by said video signal recording processor and said first portion of the audio signal processed by said first audio signal processor, collectively assigning an error-correcting code to the integrated video signal and said first portion of the audio signal to generate first error-correcting-encoded data and recording said first error-correcting-encoded data in a first area of a recording medium; and a second signal recording processor for recording said recording dummy data received from said second audio signal recording processor or high-frequency component data extracted from the video signal by said video signal recording processor in a second area of said recording medium during normal recording, and error-correcting-encoding said second portion of the audio signal to generate second error-correcting-encoded data and recording said second error-correcting-encoded data in said second area of said recording medium during post-scoring recording.

2. A digital signal recording and reproducing apparatus of claim 1, further comprising:
a first signal reproducing processor for reproducing said first error-correcting-encoded data from said first area of said recording medium, decoding said first error-correcting-encoded data and separating the decoded data into a reproduced video signal and a first reproduced audio signal;
a second signal reproducing processor for outputting reproduced dummy data or high-frequency component reproducing data from said second area of said recording medium during said normal recording and decoding said second error-correcting-encoded data to generate a second reproduced audio signal during said post-scoring recording;
a first audio signal reproducing processor for processing and outputting said first reproduced audio signal;
a second audio signal reproducing processor for processing and outputting said second reproduced audio signal during said post-scoring recording and outputting said reproduced dummy data during said normal recording; and
a video signal reproducing processor for processing and outputting said reproduced video signal and said first reproduced audio signal and said high-frequency component reproducing data during said normal recording.

3. A digital signal recording and reproducing apparatus of claim 1, wherein said video signal recording processor comprises an analog-to-digital converter and said video signal recording processor converts the video signal to a digital signal, samples said digital signal, time-base processes the sampled digital signal and data-compresses the time-base processed signal by DCT for outputting the processed video signal to said first signal recording processor.

4. A digital signal recording and reproducing apparatus of claim 1, wherein said first audio signal recording processor comprises an analog-to-digital converter and said first audio signal recording processor samples and digitizes said first portion of this audio signal for outputting to only said first signal recording processor during said normal recording and outputting to both said first and second signal recording processors during said post-scoring recording.

5. A digital signal recording and reproducing apparatus of claim 1, wherein said second audio signal recording processor comprises analog-to-digital converters.

6. A digital signal recording and reproducing apparatus of claim 1, wherein said recording medium comprises a magnetic tape including a plurality of tracks.

7. A digital signal recording and reproducing apparatus of claim 6, wherein the audio signal comprises four channels of audio signals.

8. A digital signal recording and reproducing apparatus of claim 7, wherein the video signal and two of said four channels of the audio signal are recorded in said first area of said tracks and the other two of said four channels of the audio signal are recorded in said second area of said tracks.

9. A digital signal recording and reproducing apparatus of claim 6, wherein each of said plurality of tracks comprises an area designated for recording an INDEX signal for indicating that said high frequency component data of the video signal is recorded and an ATF signal for controlling tape feeding.

10. A digital signal recording and reproducing apparatus of claim 8, wherein said second area comprises an exclusive area for said post-scoring recording.

11. A digital signal recording and reproducing apparatus of claim 8, wherein said second area comprises a plurality of areas for said post-scoring recording.

12. A digital signal recording and reproducing apparatus of claim 2, wherein said video signal reproducing processor comprises a digital-to-analog converter and said video signal reproducing processor performs compression-restoration processing, time-base processing and sampling of said first reproduced video signal for outputting an analog video signal.

13. A digital signal recording and reproducing apparatus of claim 2, wherein said first audio signal reproducing processor comprises digital-to-analog converters and said first audio signal reproducing processor samples and digitizes said first reproduced audio signal for outputting a first analog audio signal.

14. A digital signal recording and reproducing apparatus of claim 2, wherein said second audio signal reproducing processor comprises digital-to-analog converters.

15. A digital recording and reproducing apparatus of claim 1, further comprising:
a signal processor recording switch for switching between said first and second signal recording processors;
a digital modulation recording processor for performing digital modulation processing on the video and audio signals and the data;
a recording amplifier for amplifying signals and data digitally modulated by said digital modulation recording processor;
a recording/reproducing selector for selecting between reproducing and recording modes; and
a recording/reproducing head for recording the signals and data amplified to said recording amplifier to said recording medium when said recording mode is selected.

16. A digital recording and reproducing apparatus of claim 2, further comprising:
a recording/reproducing head for reproducing signals from said recording medium;
a recording/reproducing selector for selecting between reproducing and recording modes;
a reproducing amplifier for amplifying the signals from said recording/reproducing head when said reproducing mode is selected;
a digital modulation reproducing processor for performing digital modulation processing on the signals amplified by said reproducing amplifier; and
a signal processor reproducing switch for switching between said first and second reproducing processor.

17. A method for digitally recording and reproducing a video signal and an audio signal, comprising the steps of:
(a) receiving and processing the video signal;
(b) processing a first portion of the audio signal;
(c) processing a second portion of the audio signal and generating recording dummy data during normal recording;
(d) integrating the video signal processed at said step (a) and said first portion of the audio signal processed at said step (b);
(e) collectively assigning an error-correcting code to the video signal and said first portion of the audio signal integrated at said step (d) for generating first error-correcting-encoded data;
(f) recording said first error-correcting-encoded data in a first area of a recording medium;
(g) recording said recording dummy data generated at said step (c) or high-frequency component data extracted from the video signal in a second area of said recording medium during normal recording; and
(h) error-correcting-encoding said second portion of the audio signal to generate second error-correcting-encoded data and recording said second error-correcting-encoded data in said second area of said recording medium during post-scoring recording.

18. A method for digitally recording and reproducing of claim 17, further comprising the steps of:
(i) reproducing said first error-correcting-encoded data from said first area of said recording medium, decoding said first error-correcting-encoded data and separating the decoded data into a reproduced video signal and a first reproduced audio signal;
(j) outputting reproduced dummy data or high-frequency component reproducing data from said second area of said recording medium during said normal recording;
(k) decoding said second error-correcting-encoded data to generate a second reproduced audio signal during said post-scoring recording;
(l) processing and outputting said first reproduced audio signal;
(m) processing and outputting said second reproduced audio signal during said post-scoring recording;
(n) outputting said reproduced dummy data during said normal recording; and
(o) processing and outputting said reproduced video signal and said first reproduced audio signal and said high-frequency component reproducing data during said normal recording.

19. A method for digitally recording and reproducing of claim 17, wherein said step (a) converts the video signal to a digital signal, samples said digital signal, time-base processes the sampled digital signal and data-compresses the time-base processed signal by DCT for outputting the processed video signal.

20. A method for digital recording and reproducing of claim 17, wherein said step (b) samples and digitizes said first portion of the audio signal for outputting only to only a first signal recording processor during said normal recording and to both said first signal recording processor and a second signal recording processor during said post-scoring recording.

21. A method for digitally recording and reproducing of claim 17, wherein said recording medium comprises a magnetic tape including a plurality of tracks, the audio signal comprises four channels of audio signals and the video signal and two of said four channels of the audio signal are recorded in said first area of said tracks and the other two of said four channels of the audio signal are recorded in said second area of said tracks.

22. A method for digitally recording and reproducing of claim 21, wherein said plurality of tracks comprises an area designated for recording an INDEX signal for indicating that said high-frequency component data of the video signal is recorded and an ATF signal for controlling tape feeding.

23. A method for digitally recording and reproducing of claim 18, wherein said step (i) performs compression-restoration processing, time-base processing, sampling of said first reproduced video signal and converting to an analog signal for outputting an analog video signal.

24. A method for digitally recording and reproducing of claim 18, wherein said step (l) samples and digitizes said first reproduced audio signal for outputting a first analog audio signal.

25. A method for digitally recording and reproducing of claim 17, further comprising the steps of:
(i) switching between said step (f), (g) and (h) for recording said first and second error-correcting-encoded data, said recording dummy data and said high-frequency component data;
(j) digitally modulating the data switched at said step (i);
(k) amplifying said digitally modulated data from said step (j);
(l) selecting between recording and reproducing modes; and
(m) recording the data amplified at said step (k) on said recording medium when said recording mode is selected at said step (l).

26. A method for digitally recording and reproducing of claim 18, further comprising the steps of:
(p) reproducing signals from said recording medium;
(q) selecting between recording and reproducing modes;
(r) amplifying the signals reproduced at said step (p) when said reproducing mode is selected;
(s) digitally modulating the signals amplified at said step (r); and
(t) switching between said steps (l)–(o) for supplying the digitally modulated signals from said step (s) thereto.

* * * * *